US009052381B2

(12) United States Patent
Woolaway et al.

(10) Patent No.: US 9,052,381 B2
(45) Date of Patent: Jun. 9, 2015

(54) DETECTOR ARRAY FOR HIGH SPEED SAMPLING OF AN OPTICAL PULSE

(75) Inventors: James T. Woolaway, Santa Barbara, CA (US); John D. Schlesselmann, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 420 days.

(21) Appl. No.: 12/776,094

(22) Filed: May 7, 2010

(65) Prior Publication Data

US 2011/0272559 A1    Nov. 10, 2011

(51) Int. Cl.
| | |
|---|---|
| G01C 3/08 | (2006.01) |
| G06M 7/00 | (2006.01) |
| G01S 7/486 | (2006.01) |
| G01S 17/89 | (2006.01) |

(52) U.S. Cl.
CPC .............. G01S 7/4863 (2013.01); G01S 17/89 (2013.01)

(58) Field of Classification Search
CPC ... H04N 3/3658; H04N 5/374; H04N 5/3745; H04N 5/37452; H04N 5/37455; H04N 5/37457; H01L 27/14643; H01L 27/14609; G01C 3/08; G01S 7/4863; G01S 7/483; G01S 7/4861; G01S 17/89
USPC ............ 250/208.1, 214 R, 214.1, 201.1, 206, 250/214 A, 214 AG, 214 C, 221, 338.1, 250/338.4, 339.02, 339.06; 348/317, 135, 348/138, 294, 300, 301, 311, 312; 356/4.01, 5.01, 5.03, 5.05, 5.06, 5.07, 356/5.08; 327/514
See application file for complete search history.

(56) References Cited

U.S. PATENT DOCUMENTS

| | | | |
|---|---|---|---|
| 4,734,583 A * | 3/1988 | Wang et al. ............... 250/332 |
| 5,144,525 A * | 9/1992 | Saxe et al. ................. 365/45 |
| 5,243,541 A | 9/1993 | Ulich | |
| RE34,908 E | 4/1995 | Wyles et al. | |
| 5,446,529 A | 8/1995 | Stettner | |
| 5,475,225 A | 12/1995 | Stettner | |
| 5,756,999 A | 5/1998 | Parrish et al. | |
| 5,801,666 A | 9/1998 | MacFarlane | |
| 5,909,026 A | 6/1999 | Zhou | |
| 6,028,309 A | 2/2000 | Parrish et al. | |
| 6,133,596 A | 10/2000 | Woolaway et al. | |
| 6,137,566 A | 10/2000 | Leonard et al. | |
| 6,288,387 B1 | 9/2001 | Black et al. | |
| 6,316,777 B1 | 11/2001 | Parrish et al. | |

(Continued)

OTHER PUBLICATIONS

Canesta Inc., Canesta 101, Introduction to 3D Vision in CMOS, Mar. 2008, pp. 1-20.

(Continued)

*Primary Examiner* — Pascal M Bui Pho
*Assistant Examiner* — Jennifer Bennett
(74) *Attorney, Agent, or Firm* — Haynes and Boone, LLP

(57) ABSTRACT

Various techniques are provided for performing detection using a focal plane array (FPA). For example, in one embodiment, a unit cell of an FPA may be implemented to support rapid sampling in response to one or more laser pulses reflected from an object or feature of interest. An FPA implemented with such unit cells may be used, for example, in an imaging system capable of detecting a plurality of two dimensional image frames and providing a three dimensional image using the detected two dimensional image frames. Other applications of such rapid sampling unit cells are also contemplated.

24 Claims, 17 Drawing Sheets

(56) References Cited

U.S. PATENT DOCUMENTS

| | | | |
|---|---|---|---|
| 6,344,651 B1 | 2/2002 | Woolaway et al. | |
| 6,452,666 B1 | 9/2002 | Barna | |
| 6,465,798 B1 | 10/2002 | Hoelter et al. | |
| 6,522,395 B1 * | 2/2003 | Bamji et al. | 356/5.01 |
| 6,593,562 B1 | 7/2003 | Parrish et al. | |
| 6,614,286 B1 * | 9/2003 | Tang | 327/337 |
| 6,646,247 B2 * | 11/2003 | Hosier et al. | 250/208.1 |
| 6,803,555 B1 | 10/2004 | Parrish et al. | |
| 6,812,465 B2 | 11/2004 | Parrish et al. | |
| 6,882,409 B1 | 4/2005 | Evans et al. | |
| 7,453,553 B2 | 11/2008 | Dimsdale | |
| 7,800,673 B2 * | 9/2010 | Sugawa et al. | 348/308 |
| 7,994,465 B1 * | 8/2011 | Bamji et al. | 250/214 R |
| 8,125,620 B2 * | 2/2012 | Lewis | 356/5.01 |
| 8,552,375 B1 | 10/2013 | Aziz et al. | |
| 8,587,637 B1 | 11/2013 | Cryder et al. | |
| 2003/0122544 A1 | 7/2003 | Parker et al. | |
| 2006/0012599 A1 | 1/2006 | Blask et al. | |

OTHER PUBLICATIONS

Apogee Instruments Inc., Correlated Double Sampling (CDS), http://www.ccd.com/ccd107.html, Feb. 24, 2009, 1 page.

ROIC Overview, RNET Technologies, Inc., http://rnet-tech.com/products/roic/roic_overview.html, Jan. 5, 2009, 2 pages.

Z. Bielecki, Readout Electronics for Optical Detectors, Opto-Electronics Review 12, No. 1, 2004, pp. 129-137.

John L. Vampola, Readout Electronics for Infrared Sensors, The Infrared and Electro-Optical Systems Handbook, Chapter 5, pp. 287-342, copublished by Infrared Information Analysis Center Environmental Research Institute of Michigan, Ann Arbor, Michigan and SPIE Optical Engineering Press, Bellingham, Washington, publication date: Jan. 1993.

* cited by examiner

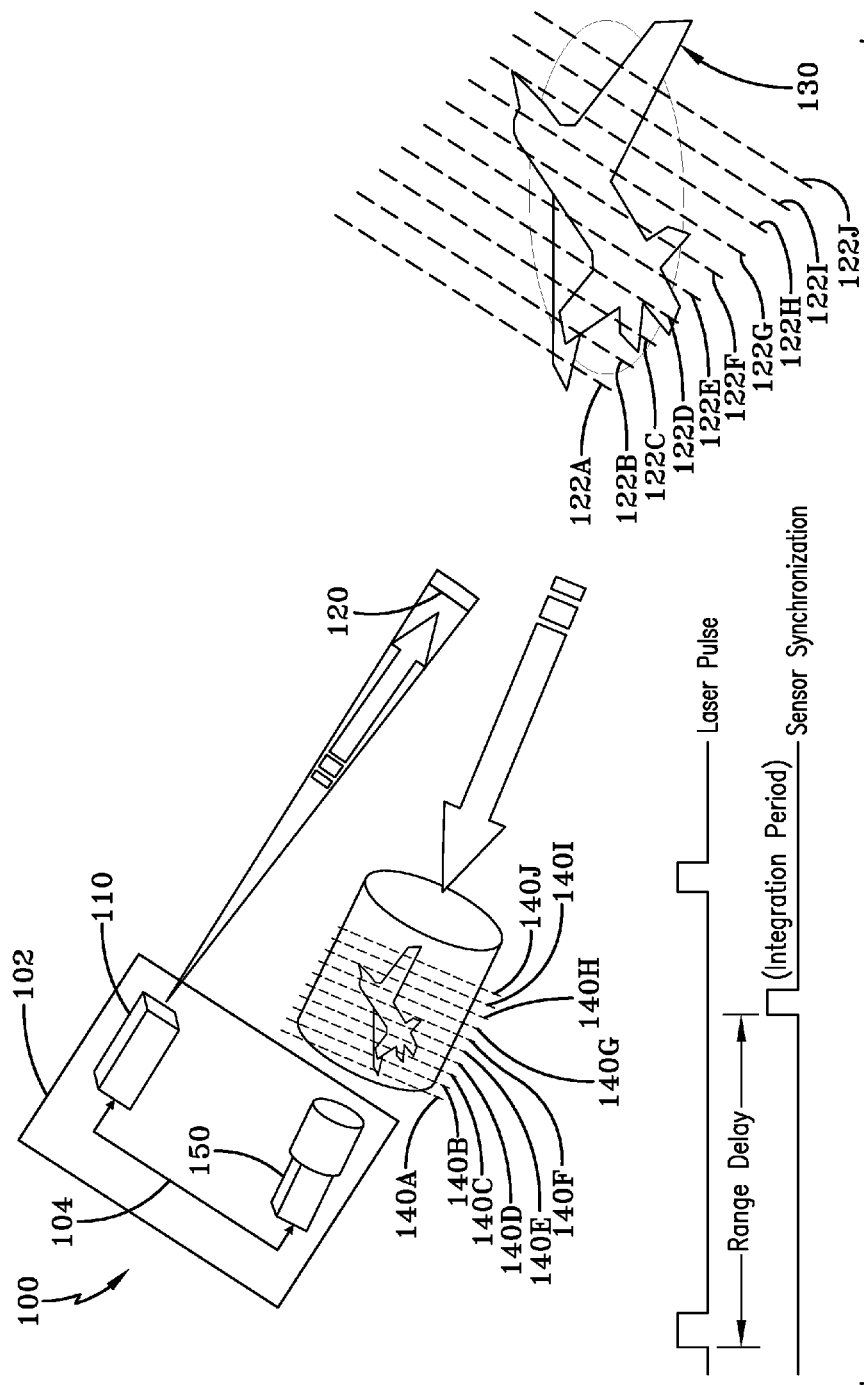

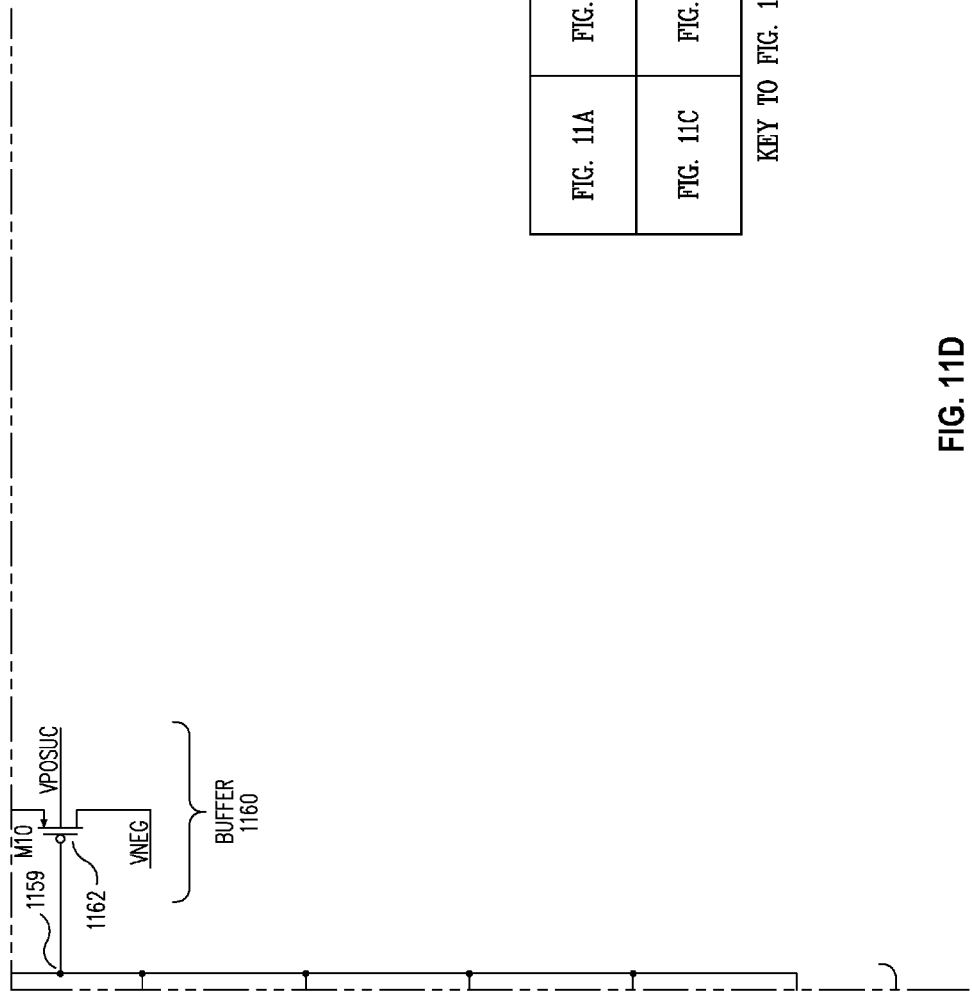

DETECTOR ARRAY FOR HIGH SPEED SAMPLING OF AN OPTICAL PULSE

TECHNICAL FIELD

The invention relates generally to imaging systems and, more particularly, for example, to high speed sampling of data for imaging system applications.

BACKGROUND

Imaging systems are often deployed on various airborne and ground-based platforms to detect objects or features of objects. However, many existing systems are typically unable to provide satisfactory three dimensional images to accurately identify and locate specific objects or features.

For example, although certain radar systems and laser detection and ranging ("LADAR") systems may be used to provide three dimensional images, such systems are typically unable to provide the images at sufficiently high resolutions for accurate object or feature identification. Moreover, existing LADAR systems often use small diverging lasers that may require impractically long scan times.

As another example, although imaging systems employing high resolution imaging sensors (e.g., electro-optic sensors) may be used to provide two dimensional images at resolutions suitable for object and feature detection, such systems typically fail to provide range information associated with the two dimensional images. Thus, such systems may be unable to provide accurate three dimensional object identification or geo-location.

As a further example, existing image detectors often require long sampling times. However, such sampling times may render the detectors unsuitable for many applications, such as the rapid detection of images in response to one or more laser pulses.

Accordingly, there is a need for an improved imaging system. In particular, there is a need for an imaging system that may facilitate rapid sampling of two dimensional images which may be used to provide three dimensional images.

SUMMARY

In one embodiment, a unit cell of a focal plane array (FPA) includes a detector comprising a diode adapted to provide a current in response to an optical pulse received by the detector. The unit cell also includes an integrator circuit comprising an input node adapted to receive the current from the detector, an output node, a source follower amplifier connected between the input node and the output node and adapted to provide a first voltage at the output node that changes in response to the current received at the input node, and a first switch adapted to selectively set the input node to a reset voltage before the current is received from the detector. The unit cell also includes a sample and hold (S/H) circuit comprising a first capacitor and a second switch. The S/H circuit is adapted to sample a second voltage across the first capacitor using the second switch, wherein the second voltage is associated with the first voltage. The unit cell also includes a buffer adapted to provide the second voltage to be read out from the unit cell.

In another embodiment, a method of operating a unit cell of a focal plane array (FPA) includes setting an input node of an integrator circuit to a reset voltage by operating a first switch; detecting an optical pulse using a diode; providing a current to the input node in response to the detecting, wherein the current causes the input node to adjust from the reset voltage to an input voltage; providing a first voltage at an output node of the integrator circuit based on the input voltage; sampling a second voltage across a first capacitor using a second switch, wherein the second voltage is associated with the first voltage; and providing the second voltage to be read out from the unit cell.

In another embodiment, a unit cell of a focal plane array (FPA) includes means for setting an input node of an integrator circuit to a reset voltage; means for detecting an optical pulse; means for providing a current to the input node in response to the detecting means, wherein the current causes the input node to adjust from the reset voltage to an input voltage; means for providing a first voltage at an output node of the integrator circuit based on the input voltage; means for sampling a second voltage associated with the first voltage; and means for providing the second voltage to be read out from the unit cell.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1A illustrates a three dimensional imaging system operating to image an object in accordance with an embodiment of the invention.

Embodiments of the invention and their advantages are best understood by referring to the detailed description that follows. It should be appreciated that like reference numerals are used to identify like elements illustrated in one or more of the figures.

DETAILED DESCRIPTION

Figure 1B:
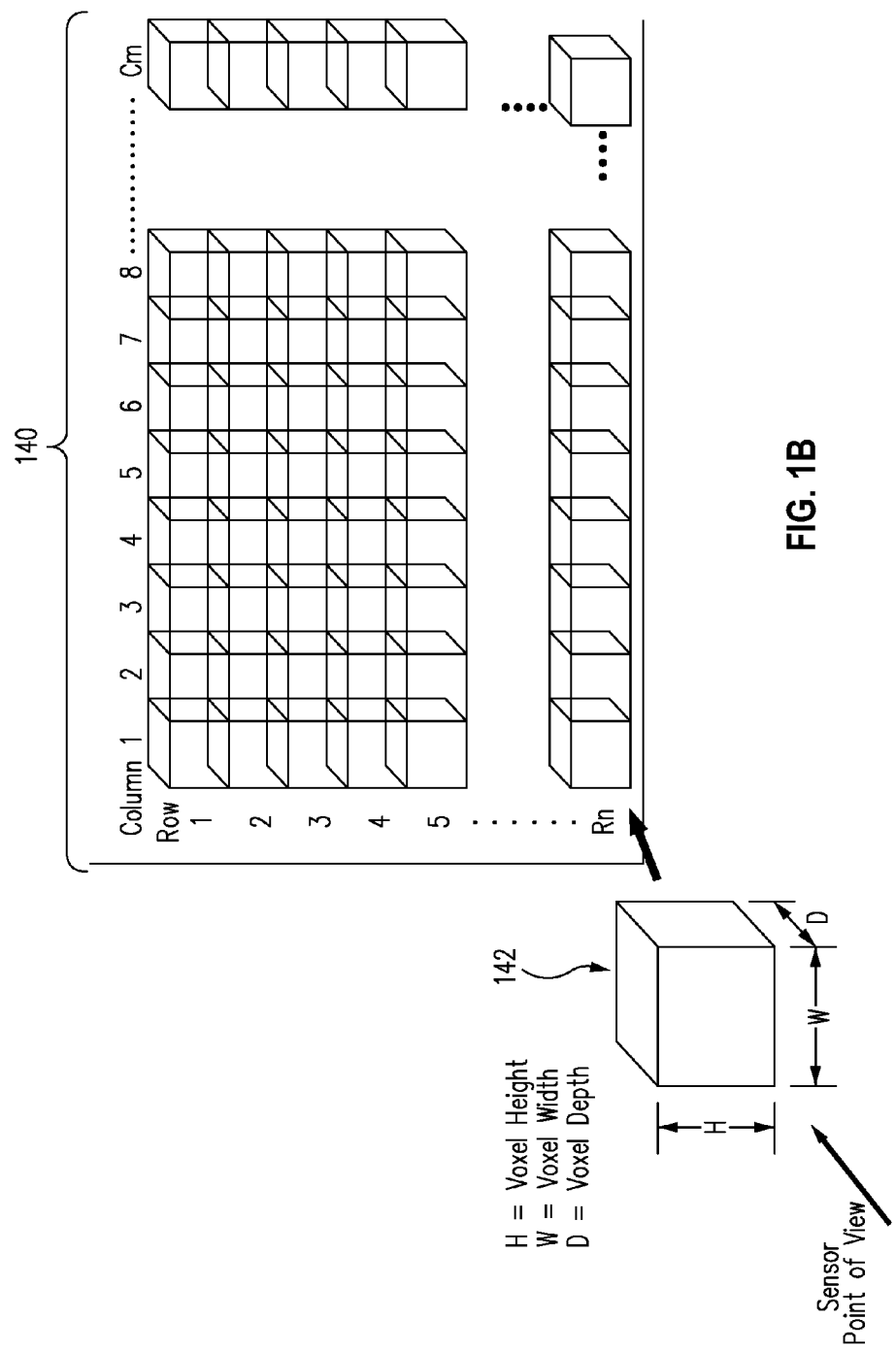
FIG. 1B illustrates an image frame detected by the three dimensional imaging system of FIG. 1A in accordance with an embodiment of the invention.

FIG. 1A illustrates a three dimensional imaging system 100 operating to image an object 130 in accordance with an embodiment of the invention. In FIG. 1A, object 130 is shown to be an aircraft. However, any desired object may be imaged such as, for example, one or more targets, vehicles, buildings, threats, features, or any other items of interest.

System 100 includes a laser illuminator 110 and a sensor 150 (e.g., an imaging sensor) positioned together on a movable turret 102. Turret 102 (e.g., a pointer) may be configured, for example, so that it may be mounted or otherwise attached to a ground-based position, an aircraft, a vehicle, or any other desired location. Accordingly, laser illuminator 110 and sensor 150 may be selectively directed toward object 130 using turret 102.

Laser illuminator 110 is configured to emit (e.g., transmit) a laser pulse 120 toward object 130 which may be reflected by object 130 back toward sensor 150 as a plurality of two dimensional image frames 140 (e.g., also referred to as slices and optical pulses). Although the use of laser pulse 120 is specifically identified herein, any desired source of visible or non-visible light may be used. In various embodiments, the pulse frequency of the visible or non-visible laser pulse 120 (e.g., light pulse) may have various ranges. In one embodiment, the pulse frequency may range from approximately 1 Hz to approximately 50 kHz. In another embodiment, the pulse frequency may range from approximately 10 kHz to approximately 15 kHz. Other ranges may be used in other embodiments.

Laser illuminator 110 and sensor 150 may communicate with each other through a synchronization connection 104 which may be used to activate sensor 150 in a gated fashion to selectively detect image frames 140. In one embodiment, sensor 150 may be implemented as an active-gated sensor such as an active gated short-wave infrared (AGSWIR) receiver. In another embodiment, sensor 150 may be polarized such that image frames 140 of particular wavelengths may be detected. Other types of sensors may be used in other embodiments.

Laser pulse 120 is shown being emitted toward object 130. As laser pulse 120 passes across object 130, one or more image frames 140 may be reflected back toward sensor 150 by different surfaces of object 130 in different planes 122. In FIG. 1A, ten image frames 140 (labeled 140A-J) are provided from ten corresponding planes 122 (labeled 122A-J) of object 130. However, any desired number of image frames 140 corresponding to any desired number of planes 122 may be used in other embodiments (e.g., "J" may represent any desired number).

FIG. 1B illustrates an image frame 140 (e.g., one of image frames 140A-J) detected by system 100 in accordance with an embodiment of the invention. Detected image frames are also referred to as data frames. As shown in FIG. 1B, image frame 140 includes an array of three dimensional volume pixels (voxels) 142 arranged in a plurality of rows and columns. Voxels 142 represent the two dimensional intensity return for each pixel (e.g., photosite) of a focal plane array (FPA) of sensor 150. In one embodiment, the height and width of voxels 142 may be determined by the particular implementation of sensor 150, and the depth of voxels 142 may be determined by the range resolution provided by system 100 (e.g., the granularity with which image frames 140 associated with different planes 122 may be ascertained).

Figure 1C:
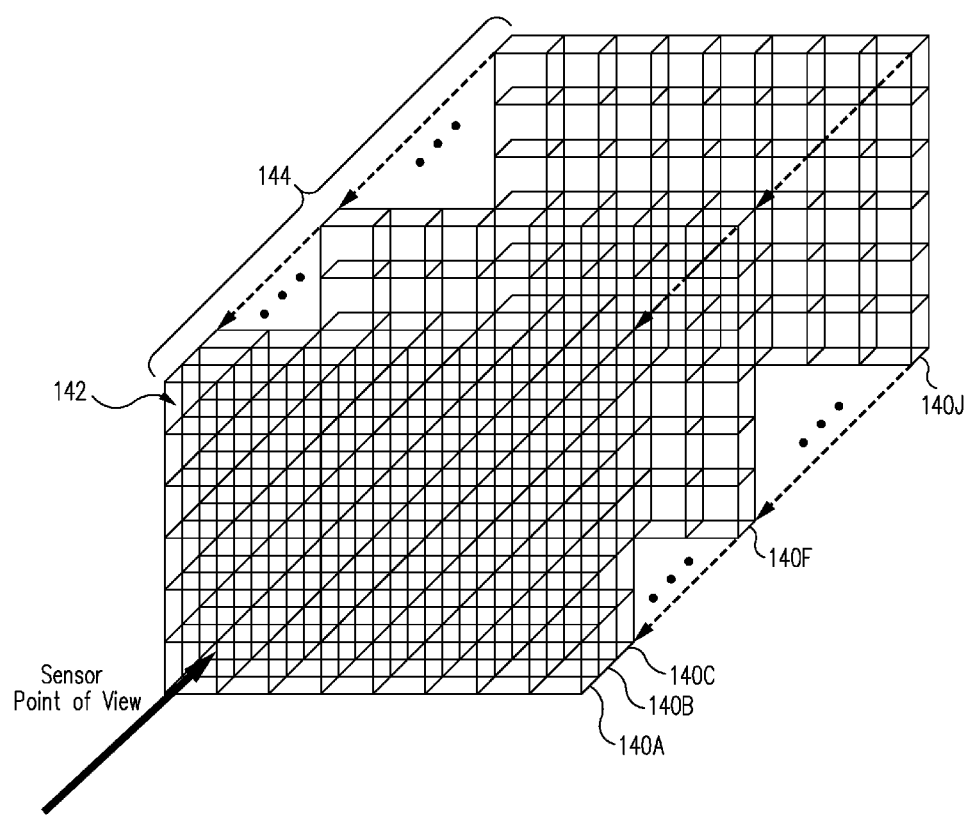
FIG. 1C illustrates a plurality of image frames detected by the three dimensional imaging system of FIG. 1A in accordance with an embodiment of the invention.

FIG. 1C illustrates a plurality of image frames 140A-J detected by system 100 in accordance with an embodiment of the invention. Image frames 140A-J collectively provide a three dimensional array 144 of voxels 142 which may be used to provide a three dimensional image of object 130.

Referring again to FIG. 1A, in one embodiment, a plurality of laser pulses 120 may be used to acquire a three dimensional image of object 130, with each image frame 140 being provided by a corresponding one of the laser pulses 120 (e.g., with a one-to-one correspondence between each laser pulse 120 and each image frame 140). For example, a first laser pulse 120 may be emitted by laser illuminator 110 which is reflected back from plane 122A as image frame 140A. In this regard, sensor 150 may be triggered during an integration period to detect image frame 140A after a delay period (e.g., a delay time also referred to as a range delay) corresponding to the time elapsing for the first laser pulse 120 to propagate from laser illuminator 110 to plane 122A and for the first laser pulse 120 to be reflected back to sensor 150 as image frame 140A. In some embodiments, the integration period may be approximately one nanosecond or less. In other embodiments, other integration periods may be used (e.g., depending upon the pulse frequency of laser illuminator 110).

Thereafter, a second laser pulse 120 may be emitted by laser illuminator 110 which is reflected back from plane 122B as image frame 140B. In this regard, sensor 150 may be triggered to detect image frame 140B after a longer delay period than was used in the previous detection of image frame 140A. This longer delay period corresponds to the time elapsing for the second laser pulse 120 to propagate from laser illuminator 110 to plane 122B and for the second laser pulse 120 to be reflected back to sensor 150 as image frame 140B. Because plane 122B is located further away from system 100 than plane 122A, the elapsed time between the emission and detection of the second laser pulse 120 will be greater than that of the first laser pulse 120.

This process may be repeated for additional laser pulses 120, each of which may be detected after progressively longer elapsed times until a desired number of laser pulses 120 have been transmitted to object 130 and reflected back as image frames 140.

In another embodiment, rather than having a one-to-one correspondence between each laser pulse 120 and each image frame 140, successive laser pulses 120 may be used to detect image frames 140 corresponding to the same plane 122 of object 130. For example, after a first image frame 140A is detected using a first laser pulse 120, a second laser pulse 120 may be emitted, reflected, and detected using the same elapsed time as the first laser pulse 120 to provide a second image frame 140A. The first and second image frames 140A may be summed or otherwise combined together. This process may be repeated with additional laser pulses 120 to provide a composite image frame which corresponds to the summation or combination of a plurality of all of the detected image frames 140A associated with the same plane 122A of object 130. Because the composite image frame includes the sum or combination of a plurality of detected image frames 140A, the composite image frame may be more accurate and exhibit an improved signal to noise ratio in comparison with the earlier-described approach using only a single detection of image frame 140A using a single laser pulse 120. Additional composite image frames may be obtained using multiples of image frames 140B-J in a similar fashion.

In another embodiment, a single laser pulse 120 may be used to detect a plurality of image frames 140 (e.g., all of image frames 140A-J). In this case, sensor 150 may be implemented to detect image frames 140A-J in rapid succession from a single laser pulse 120 such that an entire three dimensional image of object 130 may be ascertained using only a single laser pulse 120.

For example, as laser pulse 120 reaches plane 122A, image frame 140A may be reflected back by a surface of object 130 in plane 122A and detected by sensor 150. As laser pulse 120 propagates to plane 122B, image frame 140B may be reflected back by a surface of object 130 in plane 122B at a slightly later time in comparison to image frame 140A (e.g., due to the propagation delay of laser pulse 120 passing from plane 122A to plane 122B). Sensor 150 may rapidly switch (e.g., within a time period approximately equal to the propagation delay of laser pulse 120 passing from plane 122A to plane 122B and reflecting back from plane 122B to plane 122A as image frame 140B) to detect image frame 140B reflected by the same laser pulse 120. Additional image frames 140C-J may be reflected back from surfaces of object 130 in planes 122C-J as laser pulse 120 propagates across the entirety of object 130 and sensor 150 may switch accordingly to detect corresponding image frames 140C-J.

Figure 2:
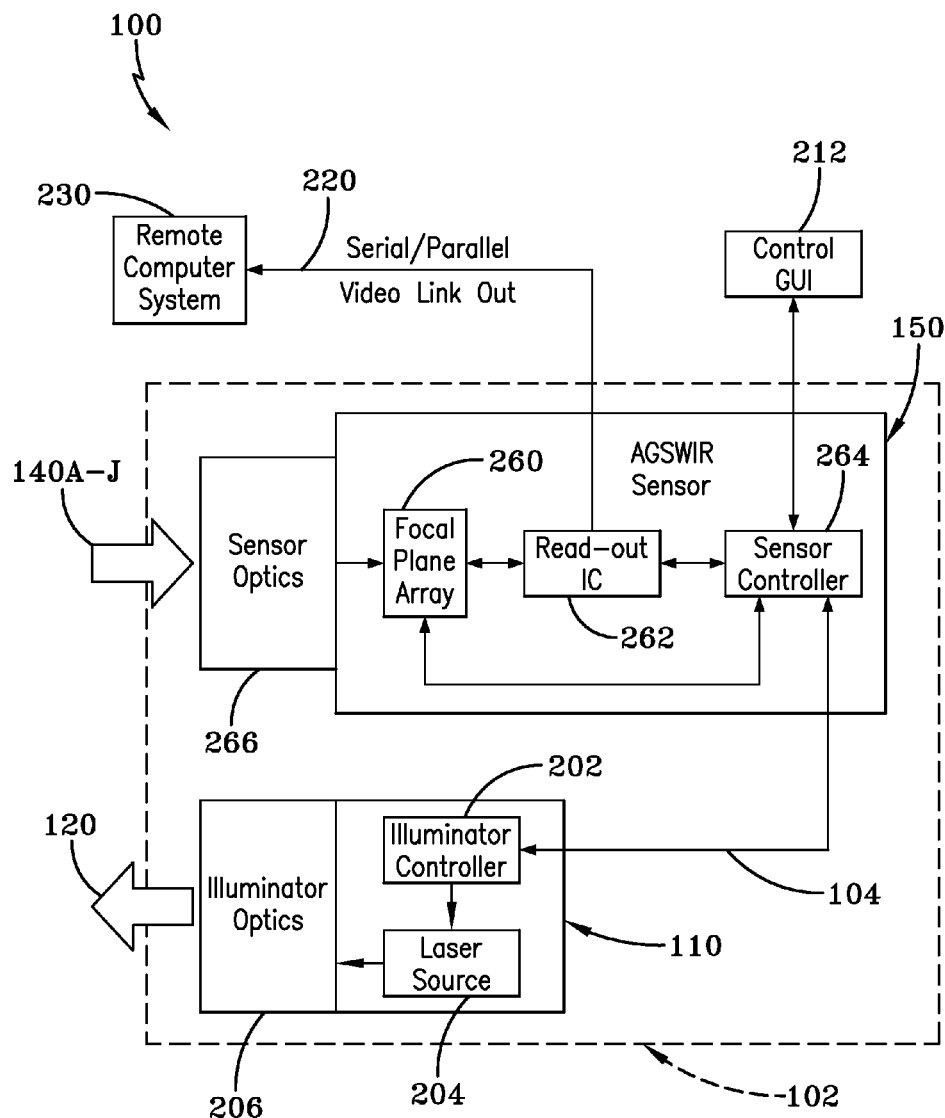
FIG. 2 illustrates an implementation example of a block diagram of the three dimensional imaging system of FIG. 1A interfaced with various components in accordance with an embodiment of the invention.

FIG. 2 illustrates an implementation example of a block diagram of three dimensional imaging system 100 interfaced with various components in accordance with an embodiment of the invention. As shown in FIG. 2, laser illuminator 110 includes an illuminator controller 202, a laser source 204, and illuminator optics 206. Illuminator controller 202 may be implemented with hardware and/or software to control the operations of laser illuminator 110 discussed herein. Laser source 204 (e.g., a laser) may be used to generate one or more laser pulses 120. In one embodiment, laser pulses 120 may have a pulse length of approximately 1 nanosecond and a wavelength in a range of approximately 900 nm to approximately 1700 nm (e.g., an eye-safe wavelength of approximately 1540 nm). Other pulse lengths and/or other wavelengths may be used in other embodiments.

In one embodiment, laser illuminator 110 may shape laser pulses 120 to have sharp leading and trailing edges to enhance the resolution of image frames 140 being collected (e.g., as shown in FIG. 1A). In another embodiment, laser source 204 may provide laser pulses 120 of different wavelengths (e.g., different colors such as red, green, and blue (RGB)) to generate color three dimensional images. Illuminator optics 206 may be used to direct laser pulses 120 generated by laser source 204 toward object 130.

As also shown in FIG. 2, sensor 150 includes an FPA 260, a read out integrated circuit (ROIC) 262, a sensor controller 264, and sensor optics 266. FPA 260 may be implemented with a plurality of unit cells (e.g., an array of 640×512 unit cells or any other desired resolution), each of which includes a detector (e.g., a photosite) and associated sampling and readout circuits. In one embodiment, the detectors of FPA 260 may be implemented as PIN diodes (e.g., each diode having an intrinsic region between a p-type region and an n-type region). For example, in one embodiment, such PIN diodes may be implemented as reverse-biased indium gallium arsenide (InGaAs) PIN photodiodes. In one embodiment, FPA 260 may be configured with discrete sensing regions, such as one region formed from InGaAs to sense short wave infrared wavelengths (e.g., approximately 1-3 micrometers), and another region formed from indium antimonide (InSb) to sense mid-wave infrared wavelengths (e.g., approximately 3-8 micrometers). In another embodiment, the detectors of FPA 260 may be implemented as avalanche photodiodes (APDs).

FPA 260 may receive image frames 140 reflected back from object 130 through sensor optics 266. In this regard, FPA 260 may sample (e.g., detect, capture, or integrate) image frames 140 to provide sampled values (e.g., voltages or currents) that may be read out from unit cells of FPA 260 by ROIC 262 and passed to sensor controller 264. In one embodiment, ROIC 262 may read out the sampled values at a data rate of approximately 1 kiloframe (e.g., 1000 image frames 140) per second. Other data rates may be used in other embodiments. In one embodiment, FPA 260 and ROIC 262 may be implemented as separate components. In another embodiment, FPA 260 may include ROIC 262.

In one embodiment, the time required for ROIC 262 to read out a single image frame 140 may be significantly longer than the time required for laser pulse 120 to propagate to object 130, reflect from object 130, and be received by sensor 150 as an image frame 140. For example, assuming that object 130 is positioned approximately one mile from system 100, the round trip time for laser pulse 120 to propagate to object 130, reflect from object 130, and be received by sensor 150 may be approximately 10 microseconds. Assuming that system 100 waits an additional 10 microseconds for residual background reflections (e.g., scatter or clutter) from the laser pulse 120 to dissipate, system 100 may be capable of sending successive laser pulses 120 in time intervals of approximately 20 microseconds in this example. In contrast, in one embodiment, ROIC 262 may take approximately 1 millisecond to read out a detected image frame 140 (e.g., assuming a read out rate of 1000 image frames 140 per second).

In view of this difference between laser pulse intervals and read out times, system 100 may be configured to perform various operations while image frames 140 are read out by ROIC 262. For example, in one embodiment, system 100 may send and receive multiple laser pulses 120 (e.g., approximately 50 in the above example) which may be received as multiple image frames 140 that are summed or combined by sensor 150 to provide a composite image frame to be read out by ROIC 262 during its next read out cycle during which time system 100 may send and receive another set of multiple laser pulses 120. Other operations may be performed while image frames 140 are read out by ROIC 262, such as resetting correlated double sampling (CDS) circuits of unit cells of sensor 150, completing sample and hold operations for the unit cells, summing or combining multiple image frames 140, or any other desired operations.

Sensor controller 264 may be implemented with hardware and/or software to control the operations of sensor 150 discussed herein. For example, in one embodiment, sensor controller 264 may provide a timer to precisely measure the time elapsing between emission of laser pulse 120 and the detection of image frames 140. Such timing measurements may be determined, for example, with an accuracy of less than approximately 1 nanosecond. By calculating the round trip of laser pulse 120 with such accuracy, sensor controller 264 may calculate the range (e.g., distance) of object 130 from system 100 with an accuracy of, for example, approximately one foot.

Sensor controller 264 may also communicate with FPA 260 and/or ROIC 262 (e.g., in an embodiment where FPA 260 and ROIC 262 are separate components and also in an embodiment where FPA 260 includes ROIC 262) to provide system control signals (e.g., master control signals) for controlling the detection of image frames 140. For example, in one embodiment, the system control signals may be provided with sufficiently high precision to be used directly by FPA 260 and ROIC 262 when performing such detection. In another embodiment, FPA 260 and/or ROIC 262 may generate local control signals with higher precision than the system control signals available from sensor controller 264. In such an embodiment, the local control signals may be derived from the system control signals, or may be generated independently from the system control signals.

As shown in FIG. 2, synchronization connection 104 is provided between illuminator controller 202 and sensor controller 264. Synchronization connection 104 permits laser illuminator 110 and the sensor 150 to communicate, such that FPA 260 may be selectively activated to detect primarily only image frames 140. That is, FPA 260 may be controlled so that detection occurs at a time after laser pulse 120 has reached object 130 and one or more of image frames 140 have been formed and are in transit toward sensor 150. By selectively activating sensor 150 in this manner, system 100 can reduce the detection of spurious environmental energy (e.g., noise), energy reflections from the emission of laser pulse 120, and other artifacts that may intervene if the detection time period was not actively coordinated with the formation of image frames 140. As a result, the fidelity of the detected image frames 140 and the resulting three dimensional image may be acquired with higher fidelity than would otherwise be available in the absence of such active gating techniques.

Sensor controller 264 may use the sampled values provided by FPA 260 and ROIC 262 and associated ranges of the various planes 122 of object 130 to determine three dimensional array 144 of voxels 142 (see FIG. 1C) which may be used to provide a three dimensional image of object 130. In this regard, it will be appreciated that three dimensional array 144 and the corresponding calculated ranges of planes 122 collectively provide a three dimensional data set that may used to provide the three dimensional image of object 130.

Sensor 150 may interface with a graphical user interface (GUI) 212 that may permit a user to control appropriate features of system 100. ROIC 262 may interface with a remote computer system 230 over one or more connections 220 such as one or more serial connections (e.g., an RS-422 interface), one or more parallel data connections, one or more video link connections (e.g., a 14-bit digital video interface), and/or other appropriate connections. In one embodiment, remote computer system 230 may be used to process various data (e.g., the sampled values provided by FPA 260 and ROIC 262, the calculated ranges of the various planes 122 of object 130, and/or three dimensional array 144 of voxels 142) to provide the three dimensional image of object 130. In another embodiment, remote computer system 230 may be used to display images (e.g., image frames 140) provided by ROIC 262.

Where appropriate, the various components of system 100 may be implemented with dedicated hardware, one or more processors, software, firmware, and/or other appropriate components. For example, in one embodiment, software and/or firmware may be provided as one or more computer programs for execution by one or more processors and stored in memory and/or a machine readable medium such as a CD-ROM or other appropriate medium.

Figure 3:
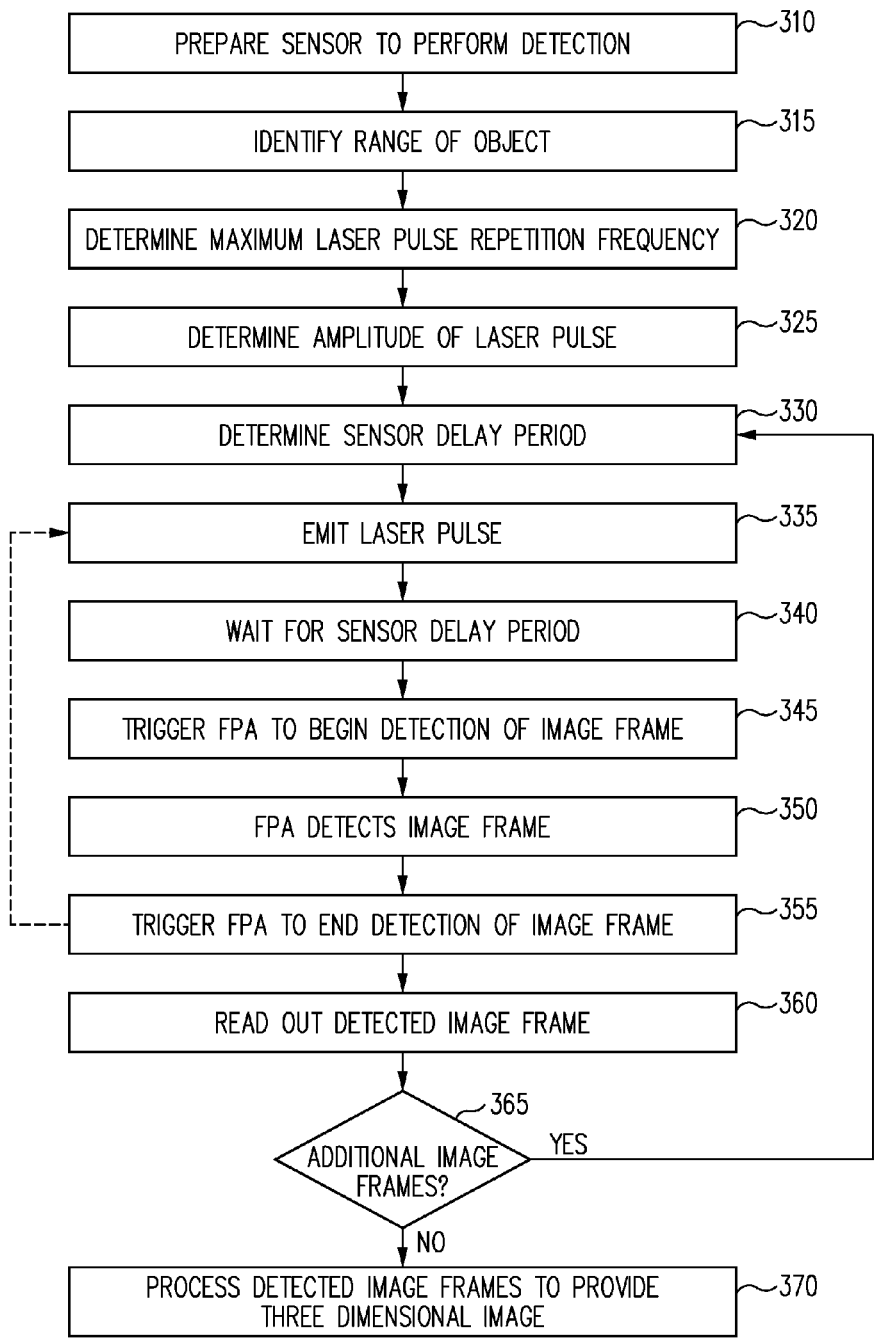
FIG. 3 illustrates a flow diagram that identifies various operations performed by the three dimensional imaging system of FIG. 1A in accordance with an embodiment of the invention.

FIG. 3 illustrates a flow diagram that identifies various operations performed by system 100 in accordance with an embodiment of the invention. In particular, the operations set forth in FIG. 3 may be performed in accordance with an embodiment in which a plurality of laser pulses 120 are used to acquire a three dimensional image of object 130, with each image frame 140 being provided by a corresponding one of the laser pulses 120 (e.g., a one-to-one correspondence between each laser pulse 120 and each image frame 140).

Referring now to the particular operations of FIG. 3, in block 310, sensor 150 is prepared to perform detection of image frames 140. For example, FPA 260 and ROIC 262 may be powered up and receive appropriate clock signals (e.g., as part of previously described system control signal) from sensor controller 264 for normal operation. Also in block 310, turret 102 may move laser illuminator 110 and sensor 150 to an appropriate position to emit laser pulses 120 toward object 130 and receive image frames 140 from object 130.

Sensor 150 identifies the range (e.g., distance) between system 100 and object 130 (block 315). For example, the range may be the distance between system 100 and the closest portion of object 130 to be imaged (e.g., plane 122A in FIG. 1A). In one embodiment, the range may be provided to sensor 150 by other components of system 100, such as GUI 212 or other appropriate components interfaced with sensor 150. In another embodiment, the range may be determined (e.g., estimated) by system 100 (e.g., by emitting laser pulse 120 and determining the elapsed time until image frame 140A is received by sensor 150).

Sensor controller 264 determines a maximum frequency at which laser illuminator 110 may repeat laser pulses 120 (block 320). In one embodiment, this maximum frequency may depend on the range identified in block 315. In another embodiment, the maximum frequency may depend on the time for laser pulses 120 to be emitted by laser illuminator 110, travel to the furthest surface of object 130 to be imaged (e.g., plane 122J), reflect from object 130 back to sensor 150 as an image frame 140 (e.g., image frame 140J), be detected by sensor 150, and the time for background reflections such as scatter or clutter to dissipate.

Sensor controller 264 determines the amplitude of laser pulse 120 (block 325). In one embodiment, the amplitude may depend on the range identified in block 315.

Sensor controller 264 determines a delay period (e.g., an estimated time of arrival for image frame 140A) for sensor 150 (block 330). In one embodiment, the delay period may depend on the range identified in block 315. For example, the delay period may correspond to the time elapsing for laser pulse 120 to propagate from laser illuminator 110 to plane 122A and for laser pulse 120 to be reflected back to sensor 150 as image frame 140A.

Sensor controller 264 sends a signal to illuminator controller 202 which causes laser source 204 to emit laser pulse 120 (block 335). As a result, laser pulse 120 is emitted toward object 130. For example, in one embodiment, sensor controller 264 may send a synchronization signal to illuminator controller 202 over synchronization connection 104 to trigger the emission of laser pulse 120.

Sensor controller 264 waits for a period of time corresponding to the sensor delay period (previously determined in block 330) before continuing (block 340). During this sensor delay period, sensor 150 does not perform detection but rather waits for laser pulse 120 to propagate toward object 130, reflect off of object 130 at plane 122A, and propagate back toward sensor 150 as image frame 140A.

Following the elapsing of the sensor delay period, sensor controller 264 triggers FPA 260 (e.g., causes FPA 260 to transition from an inactive state to an active state) to detect image frame 140A (block 345). FPA 260 then detects image frame 140A (block 350). Following a desired detection time, sensor controller 264 triggers FPA 260 to end the detection (e.g., causes FPA 260 to transition from an active state to an inactive state) in block 355.

Sensor controller 264 signals ROIC 262 to read out the detected image frame 140A from FPA 260 (block 360). As discussed, system 100 may perform other operations while read out is performed. Accordingly, in one embodiment, ROIC 262 may continue to finish reading out the detected image frame 140A while system 100 continues on to other blocks of FIG. 3. If additional image frames 140 remain to be detected (block 365), then system 100 returns to block 330. Otherwise, system 100 continues to block 370.

As discussed, the operations set forth in FIG. 3 may be performed in accordance with an embodiment in which there is a one-to-one correspondence between each laser pulse 120 and each image frame 140. In the example discussed above with regard to blocks 310 to 365, image frame 140A has been detected, but other image frames 140B-J remain to be detected. Accordingly, in this embodiment, system 100 returns to block 330 and repeats blocks 330 to 360 to emit a second laser pulse 120 and detect image frame 140B corresponding to plane 122B of object 130.

Because plane 122B is further from system 100 than plane 122A, the sensor delay period determined in the second iteration of block 330 may be increased (e.g., an offset value may be added to the original sensor delay period) to account for the additional time elapsing while the second laser pulse 120 propagates from the position of plane 122A to plane 122B and is reflected back to the position of plane 122A as image frame 140B.

System 100 may continue to repeat blocks 330 to 365 with different delay periods used to account for different planes 122 and image frames 140 until the remaining image frames 140C-J have been detected. After all of image frames 140A-J have been detected (block 365), then system 100 continues to block 370.

In block 370, image frames 140A-J are processed (e.g., by sensor controller 264, remote computer system 230, and/or other appropriate hardware and/or software) to provide a three dimensional image of object 130. For example, image frames 140A-J may be assembled in a manner that maintains the alignment and spatial relationship between corresponding planes 122A-J to provide a three dimensional image. Additional processing may be performed in block 370 to interpret (e.g., identify) object 130 and/or various features provided by image frames 140A-J and/or the three dimensional image (e.g., using appropriate statistical and feature-matching techniques to compare such information with stored models of other objects and features). Identified objects and features which may be of interest to a user of system 100 may be filtered for review by the user. In one embodiment, additional processing may be performed in block 370 to geo-register one or more of image frames 140A-J and/or the three dimensional image against a terrain database.

In the above discussion of FIG. 3, there is a one-to-one correspondence between each laser pulse 120 and each image frame 140. The flow diagram of FIG. 3 may be modified to accommodate other embodiments. For example, in another embodiment, rather than having a one-to-one correspondence between each laser pulse 120 and each image frame 140, successive laser pulses 120 may be used to detect image frames 140 (e.g., image frame 140A) corresponding to the same plane 122 (e.g., plane 122A) of object 130. Accordingly, the same delay period determined in block 330 may be used in two or more iterations of blocks 335 to 355. In this regard, system 100 may loop back from block 355 to block 335 any desired number of times (e.g., denoted by a dashed arrow in FIG. 3) to repeatedly detect and integrate the same plane 122 of object 130 using successive laser pulses 120 to build up a composite image frame over the course of multiple iterations of blocks 335 to 355. In this regard, the composite image frame may be the sum or combination (e.g., the total integration) of multiple image frames 140.

After a desired number of iterations of blocks 335 to 355 have been performed, system 100 may begin reading out the composite image frame in block 360. System 100 may continue to block 365 and loop back to block 330 to detect additional image frames 140 corresponding to other planes 122 in a similar fashion. These operations may be repeated until multiple composite image frames have been detected for each of the planes 122 of object 130. The composite image frames may be further processed in block 370 to provide a three dimensional image of object 130.

In another embodiment, the flow diagram of FIG. 3 may be modified such that a single laser pulse 120 may be used to determine a plurality of image frames 140 (e.g., all of image frames 140A-J). For example, sensor 150 may be implemented to detect image frames 140A-J in rapid succession from a single laser pulse 120 during block 350 and all of image frames 140A-J may be read out during block 360. In this embodiment, system 100 may skip block 365 and proceed directly to block 370 during which image frames 140A-J are processed to provide a three dimensional image of object 130.

In one embodiment, system 100 may be used as part of a tracking system to monitor one or more objects 130 with high accuracy and low cost. For example, system 100 may be used to determine the range of object 130 (e.g., a surface-to-air missile approaching an aircraft) at different times and calculate the incoming velocity of object 130 using the ranges. As another example, the calculated velocity of object 130 and the high resolution image detection provided by sensor 150 may be used to identify the trajectory of object 130. The identified trajectory and the high resolution image detection may assist in the identification of the particular type of object 130 (e.g., a particular type of missile or other object).

In the case of a missile, the identified trajectory may permit the missile to be effectively tracked after the missile's motor burn-out (e.g., when a lower contrast missile target is difficult to detect from background clutter). The identified trajectory may also be used to determine an estimated time to impact which may be used to decide whether the missile should be classified (e.g., in the case of a long estimated time to impact) or jammed (e.g., in the case of a short estimated time to impact).

Further implementation and operational details of various unit cells will now be discussed with regard to FIGS. 4-12. In one embodiment, such unit cells may be provided as part of FPA 260 in system 100 in the manner previously discussed herein. In other embodiments, the unit cells may be used in other systems and/or for other purposes than three dimensional imaging.

Figure 4:
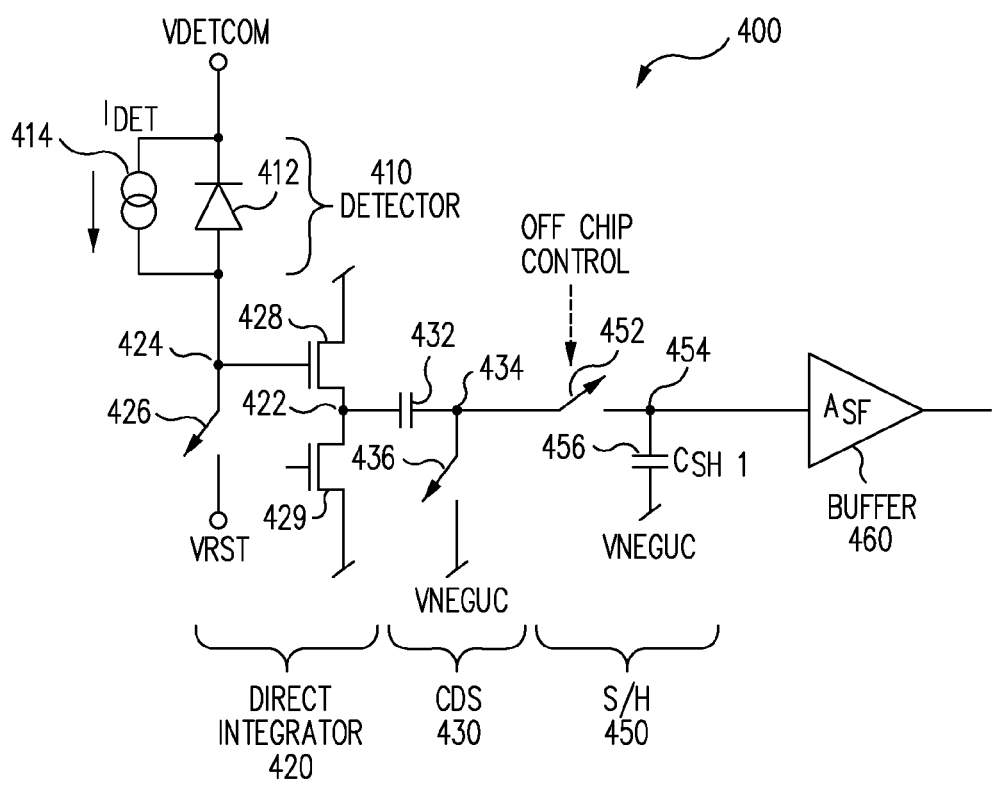
FIG. 4 illustrates a circuit diagram of a unit cell configured to capture a sample associated with an optical pulse received by a focal plane array in accordance with an embodiment of the invention.

FIG. 4 illustrates a circuit diagram of a unit cell 400 configured to capture a sample associated with an optical pulse (e.g., visible or non-visible light such as image frames 140 reflected in response to one or more laser pulses 120) received by FPA 260 in accordance with an embodiment of the invention. Unit cell 400 includes a detector 410, a direct integrator circuit 420, a CDS circuit 430, a sample and hold (S/H) circuit 450, and a buffer circuit 460.

Detector 410 may be implemented in accordance with any of the types of detectors discussed herein. In the particular embodiment shown in FIG. 4, detector 410 is modeled, for example, as a diode 412 and a current source 414. For example, an optical pulse incident on detector 410 causes detector 410 to operate as current source 414 to conduct current from a voltage source VDETCOM to a node 424.

Advantageously, direct integrator circuit 420, CDS circuit 430, and S/H circuit 450 of unit cell 400 may be implemented to respond to rapid changes (e.g., changes occurring within approximately 1 nanosecond or less) in current received from detector 410 to facilitate sampling of radiation pulses received by detector 410 with high precision (e.g., sampling at a desired time with an accuracy of approximately 1 nanosecond or less).

Direct integrator circuit 420 includes a switch 426 and transistors 428 and 429. Switch 426 may be used to selectively set the voltage of node 424 to a reset voltage VRST. Transistors 428 and 429 are connected at a node 422 in a source follower configuration. In this regard, the voltage at node 422 follows changes in the voltage at the gate of transistor 428 (i.e., at node 424).

CDS circuit 430 includes a capacitor 432 and a switch 436 connected at a node 434. Switch 436 may be used to selectively set node 434 to a reference voltage VNEGUC in accordance with correlated double sampling techniques. In this regard, switch 436 may be temporarily closed to set node 434 to reference voltage VNEGUC before sampling is performed by S/H circuit 450. In one embodiment, the sampled voltage at a node 454 corresponds to a change in the voltage at node 434. In this regard, from the time that switch 436 is opened until a switch 452 of S/H circuit 450 is closed, the voltage of node 454 may change from the reference voltage VNEGUC in response to current provided from detector 410 to direct integrator circuit 420.

S/H circuit 450 includes switch 452 which may be selectively closed to connect CDS circuit 430 to a capacitor 456 at node 454 in response to system control signals or local control signals. For example, switch 452 may remain closed while the voltage at node 454 changes in response to an optical pulse incident on detector 410. At a time determined by the control circuit, switch 452 may open to sample and hold the current voltage at node 454.

Buffer circuit 460 is connected to S/H circuit 450 at node 454 and may be used to pass samples captured by S/H circuit 450 for readout to other portions of imaging system 100. For example, in one embodiment, buffer circuit 460 may be a column buffer of a readout integrated circuit (e.g., ROIC 262) configured to read sampled values from a plurality of unit cells 400 of FPA 260.

Figure 5:
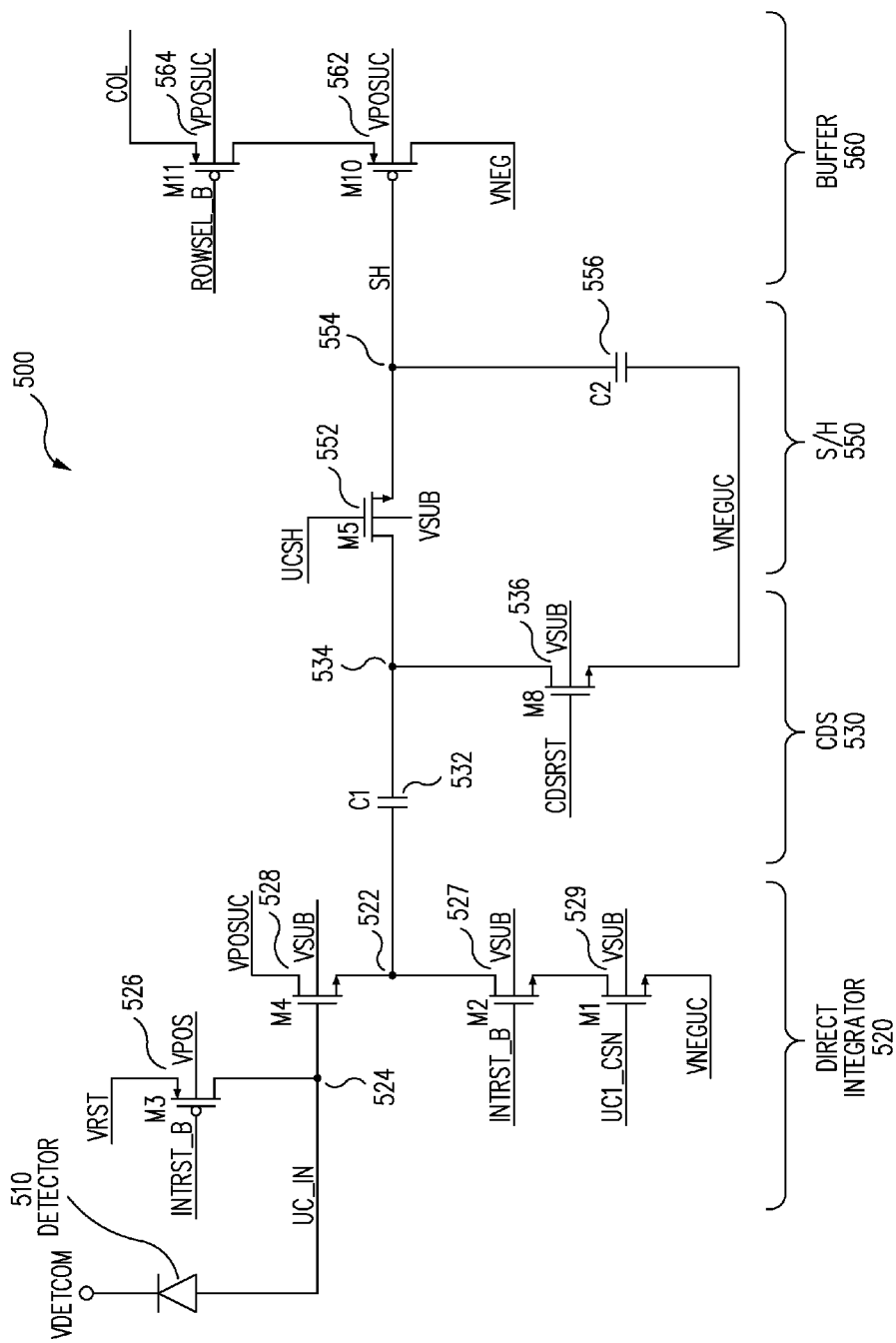
FIG. 5 illustrates a specific schematic diagram implementation example for the unit cell of FIG. 4 in accordance with an embodiment of the invention.

FIG. 5 illustrates a specific schematic diagram implementation example 500 for unit cell 400 of FIG. 4 in accordance with an embodiment of the invention. Schematic diagram 500 includes a detector 510, a direct integrator circuit 520, a CDS circuit 530, an S/H circuit 550, and a buffer circuit 560, all of which may be used to implement similar features of FIG. 4.

Direct integrator circuit 520 includes a transistor 526 which may be selectively switched by a signal INTRST_B to implement switch 426 (FIG. 4). Direct integrator circuit 520 also includes transistors 528 and 529 which may be used to implement transistors 428 and 429 (FIG. 4). As shown in FIG. 5, transistor 529 is biased by a signal UC1_CSN. Direct integrator circuit 520 also includes a transistor 527 which may be switched on by signal INTRST_B to turn on the source follower provided by transistors 528 and 529. When transistor 527 is on, the voltage at a node 522 follows changes in the voltage at the gate of transistor 528 (i.e., at a node 524).

CDS circuit 530 includes a capacitor 532 and a transistor 536 connected at a node 534 which may be used to implement capacitor 432, switch 436, and node 434 (FIG. 4). As shown in FIG. 5, transistor 536 may be selectively switched in response to a signal CDSRST.

S/H circuit 550 includes a transistor 552, a node 554, and a capacitor 556 which may be used to implement switch 452, node 454, and capacitor 456 (FIG. 4). Transistor 552 may be selectively switched in response to a signal UCSH.

Buffer circuit 560 includes transistors 562 and 564 which may be used to implement buffer circuit 460 (FIG. 4). The operation of unit cell 400 and schematic diagram 500 may be further understood with reference to FIG. 6 which illustrates a timing diagram example 600 in accordance with an embodiment of the invention.

Figure 6:
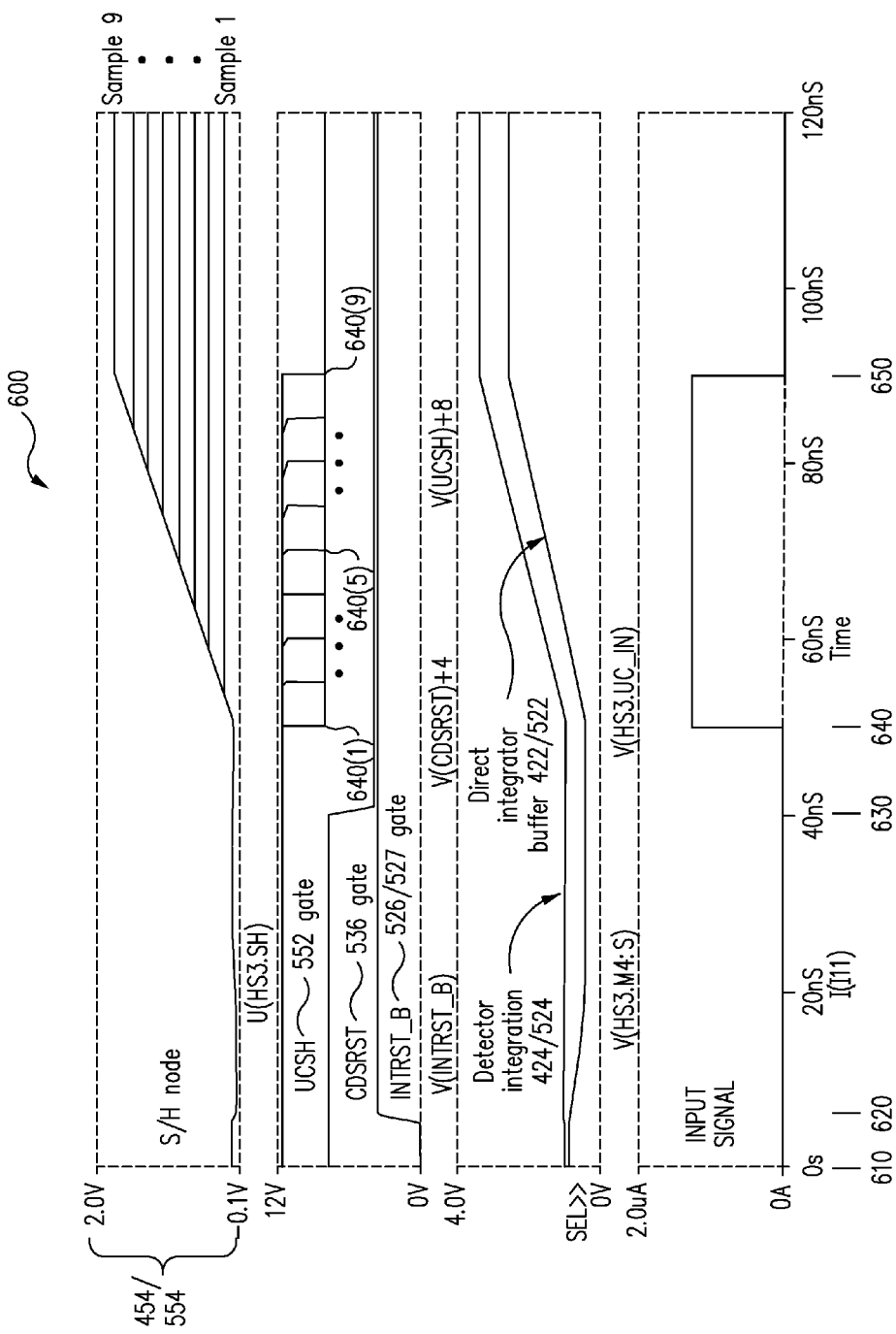
FIG. 6 illustrates a timing diagram example illustrating the operation of the unit cell of FIG. 4 and the schematic diagram of FIG. 5 in accordance with an embodiment of the invention.

As shown in FIG. 6, timing diagram 600 illustrates: the voltages at nodes 422/522, 424/524, and 454/554; signals INTRST_B, CDSRST, and UCSH (e.g., any of which may be system control signals or local control signals in various embodiments); and the current provided by detector 410/510 (i.e., current source 414) in response to an optical pulse incident on detector 410/510. The various time intervals discussed with regard to timing diagram 600 are provided only for purposes of example. Accordingly, other time intervals may be used where appropriate. For example, although time intervals of 5 nanoseconds are discussed with regard to the sampling of image frames 140, shorter time intervals (e.g., approximately 1 nanosecond or less) may be used to provide more closely spaced image frames 140 (e.g., corresponding to spacing of approximately 1 foot or less between different planes 122) for higher resolution three dimensional images.

At a time 610 (e.g., 0 nanoseconds), signal INTRST_B keeps switch/transistor 426/526 on to pull node 424/524 to reset voltage VRST. Signal INTRST_B also keeps transistor 527 turned off and keeps the source followers provided by transistors 428/528 and 429/529 turned off. Also at time 610, signal CDSRST keeps switch/transistor 436/536 turned on which operates to pull node 434/534 down to reference voltage VNEGUC. Also at time 610, signal UCSH keeps switch/transistor 452/552 turned on which operates to provide a path from CDS circuit 430/530 to S/H circuit 450/550. Any optical pulses incident on detector 410/510 are ignored (e.g., rejected as background reflections such as scatter or clutter). As a result, any current associated with an optical pulse on detector 410/510 during these times will not cause the voltage at node 424/524 to change appreciably.

At a time 620 (e.g., approximately 7 nanoseconds), signal INTRST_B turns off switch/transistor 426/526 and turns on transistor 527 which turns on the source followers provided by transistors 428/528 and 429/529. Prior to a time 630, any change in the voltage at node 424/524 due to the integration of current from detector 410/510 caused by any optical pulse will be rejected by CDS circuit 430/530.

At time 630 (e.g., approximately 40 nanoseconds), signal CDSRST turns off switch/transistor 436/536. As a result, node 434/534 is no longer actively pulled down to reference voltage VNEGUC. Rather, the voltage at node 434/534 will be free to be pulled up from reference voltage VNEGUC in response to changes in the voltage at node 422/522 (e.g., which follows changes in the voltage of node 424/524 in response to current sourced by detector 410/510).

Starting at time 630, any optical pulses incident on detector 410/510 will contribute to the output signal of unit cell 400/500. As an example, beginning at a time 640 (e.g., approximately 50 nanoseconds) and continuing to a time 650 (e.g., approximately 90 nanoseconds), detector 410/510 receives an optical pulse which causes detector 410/510 to provide a current of approximately 1.3 µA. As a result, the voltages at nodes 424/524, 422/522, 434/534, and 454/554 begin to rise at time 640 and continue to rise while detector 410/510 continues to receive an optical pulse.

Signal UCSH may be used to turn off switch/transistor 452/552 at any of times 640(1) through 640(9) which correspond to different times (e.g., at approximately 5 nanosecond intervals or other intervals) during which an optical pulse is received by detector 410/510. For example, in one embodiment, times 640(1) through 640(9) correspond to times during which image frames 140A through 140I of FIG. 1A are received by detector 410/510. Although nine discrete times 640(1) through 640(9) are shown in FIG. 6, any desired number of times or time interval lengths may be used.

The voltage of node 454/554 also rises over time until signal UCSH turns off switch/transistor 452/552 (e.g., at one of times 640(1) through 640(9). At the time that signal UCSH turns off switch/transistor 452/552, node 454/554 will be isolated from direct integrator circuit 420/520 and CDS circuit 430/530. As a result, the current voltage of node 454/554 is captured and held at node 454/554 to be read out through buffer circuit 460/560.

By operating system control signals or local control signals to turn off switch/transistor 452/552 at one of times 640(1) to 640(9)), one of nine different samples (e.g., one of samples 1 to 9) may be captured for a given optical pulse received by detector 410/510. These different samples correspond to different values of a single pixel of FPA 260 for two different two dimensional "slices" of an object reflecting the optical pulse.

For example, in one embodiment, a first sample (e.g., sample 1) may be captured at time 640(1) for a first optical pulse, a second sample (e.g., sample 2) may be captured at time 640(2) for a second optical pulse, and so on. Thus, by sampling different optical pulses at different times, a plurality of slices (e.g., corresponding to image frames 140 of FIG. 1A) of a three dimensional object (e.g., object 130 of FIG. 1A) may be obtained.

Figure 7:
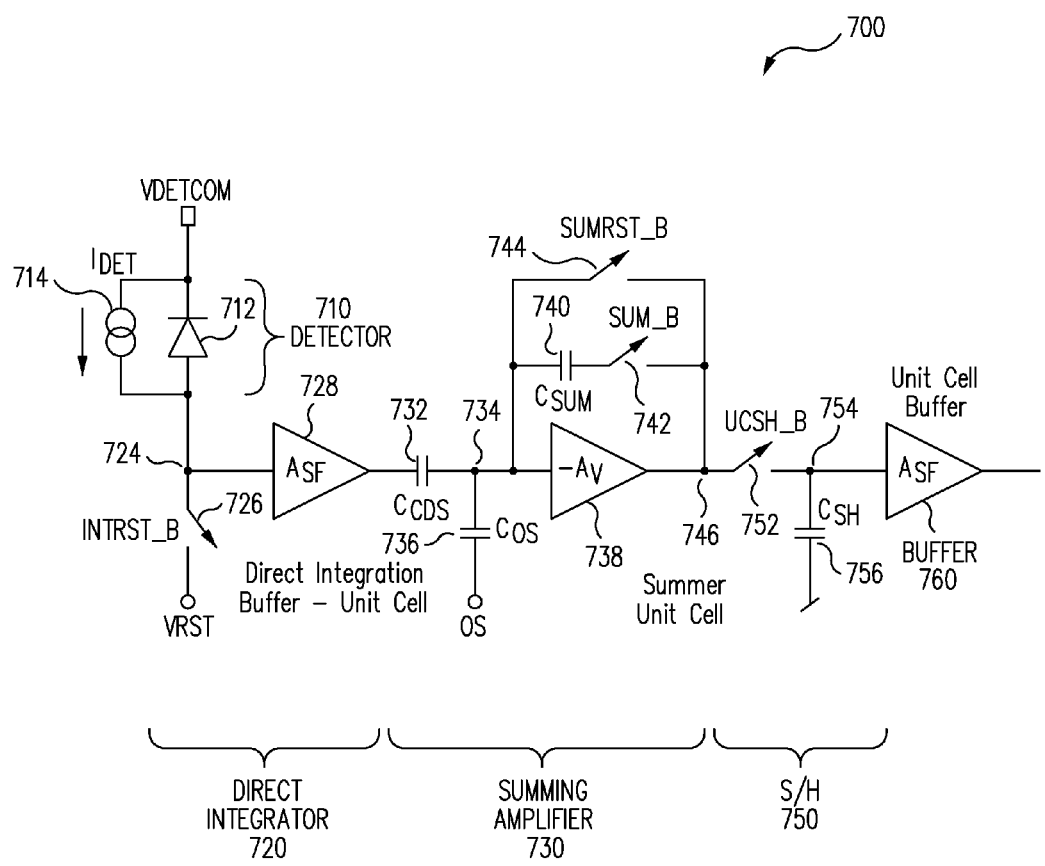
FIG. 7 illustrates another circuit diagram of a unit cell having a summing amplifier and configured to capture one or more samples associated with one or more optical pulses received by a focal plane array in accordance with an embodiment of the invention.

FIG. 7 illustrates another circuit diagram of a unit cell 700 having a summing amplifier and configured to capture one or more samples associated with one or more optical pulses received by FPA 260 in accordance with an embodiment of the invention. Unit cell 700 includes a detector 710, a direct integrator circuit 720, a summing amplifier circuit 730, an S/H circuit 750, and a buffer circuit 760.

Detector 710 may be implemented in accordance with any of the types of detectors discussed herein. In the particular embodiment shown in FIG. 7, detector 710 is modeled, for example, as a diode 712 and a current source 714. For example, an optical pulse incident on detector 710 causes detector 710 to operate as current source 714 to conduct current from a voltage source VDETCOM to a node 724.

As similarly described with regard to unit cell 400 (FIG. 4), direct integrator circuit 720, summing amplifier circuit 730, and S/H circuit 750 of unit cell 700 may be implemented to respond to rapid changes (e.g., changes occurring within approximately 1 nanosecond or less) in current received from detector 710 to facilitate sampling of radiation pulses received by detector 710 with high precision (e.g., sampling at a desired time with an accuracy of approximately 1 nanosecond or less).

Direct integrator circuit 720 includes a switch 726 and an amplifier 728. In one embodiment, switch 726 may be implemented in the manner of switch 426, and amplifier 728 may be implemented as a source follower amplifier in accordance with direct integrator circuit 420.

Summing amplifier circuit 730 includes an amplifier 738, capacitors 732, 736, and 740, and switches 742 and 744. Switch 742 may be used to selectively connect capacitor 740 in a feedback path of amplifier 738 (e.g., between nodes 734 and 746) in response to a signal SUM_B. Switch 744 may be used to selectively connect nodes 734 and 746 in response to a signal SUMRST_B.

Summing amplifier circuit 730 may be used to integrate a voltage across capacitor 740 for a plurality of optical pulses incident on detector 710. Advantageously, this approach for example may improve the signal to noise ratio of the final sampled value captured by S/H circuit 750. For example, in one embodiment, if approximately 50 optical pulses are integrated, signal to noise may be significantly improved (e.g., by a factor of approximately $\sqrt{50}$).

In one embodiment, switch 744 may be closed to reset amplifier 738 while switch 742 remains open. Thereafter, switch 744 may be opened and switch 742 may be closed to connect capacitor 740 across amplifier 738. An initial optical pulse is received by detector 710 and the voltage across capacitor 740 is permitted to increase until switch 742 is opened after a desired time period (e.g., corresponding to a particular time slice of the optical pulse). After switch 742 is opened, capacitor 740 retains its voltage while switch 744 is closed to reset amplifier 738 again. Switches 740 and 742 may be operated in this manner to integrate the voltage across capacitor 740 for any desired number of optical pulses. After the desired number of optical pulses have been integrated (e.g., for approximately the same time slice within each optical pulse), the final voltage across capacitor 740 may be sampled by S/H circuit 750.

S/H circuit 750 includes a switch 752 which may be selectively closed to connect summing amplifier circuit 730 to a capacitor 756 at a node 754 in response to a signal UCSH_B (e.g., provided by a system control signal or a local control signal). For example, a signal from summing amplifier circuit 730 may be captured at node 754 after a desired number of optical pulses have been integrated by summing amplifier circuit 730. As a result, charge built up across capacitor 740 may be transferred to and held by capacitor 756 to provide a sampled voltage to buffer circuit 760.

Buffer circuit 760 is connected to S/H circuit 750 at node 754 and may be used to pass samples captured by S/H circuit 750 for readout to other portions of imaging system 100. For example, in one embodiment, buffer circuit 760 may be a column buffer of a readout integrated circuit configured to read sampled values from a plurality of unit cells 700 of FPA 260.

Figure 8:
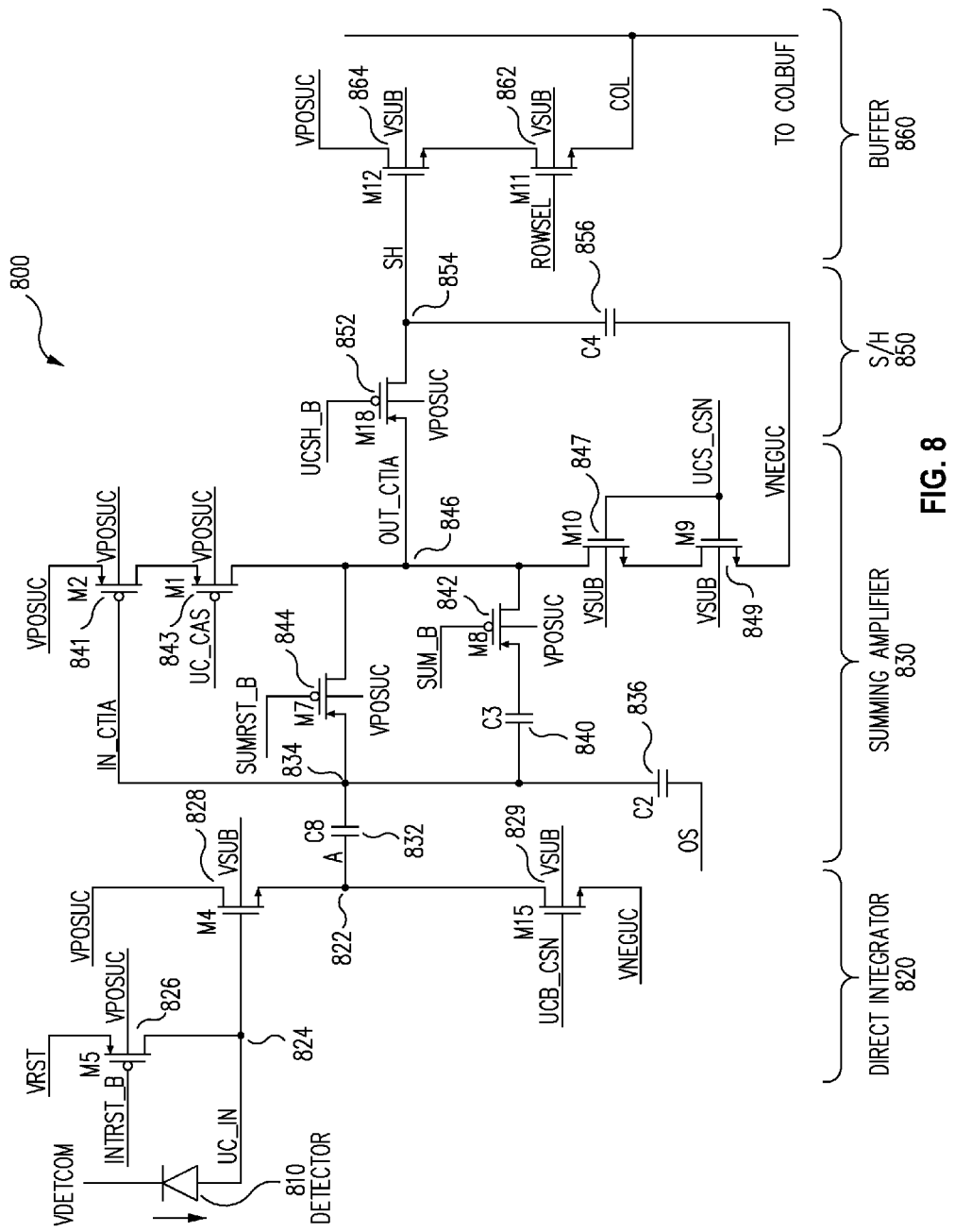
FIG. 8 illustrates a specific schematic diagram implementation example for the unit cell of FIG. 7 in accordance with an embodiment of the invention.

FIG. 8 illustrates a specific schematic diagram implementation example 800 for unit cell 700 of FIG. 7 in accordance with an embodiment of the invention. Schematic diagram 800 includes a detector 810, a direct integrator circuit 820, a summing amplifier circuit 830, an S/H circuit 850, and a buffer circuit 860, all of which may be used to implement similar features of FIG. 7.

Direct integrator circuit 820 includes a transistor 826 which may be selectively switched by signal INTRST_B to implement switch 726 (FIG. 7). Direct integrator circuit 820 also includes transistors 828 (source follower) and 829 (current source) which may be used to implement amplifier 728 (FIG. 7). The voltage at a node 822 follows changes in the voltage at the gate of transistor 828 (i.e., at a node 824).

Summing amplifier circuit 830 includes transistors 841 (driver), 843 (cascode), 847 (cascode), and 849 (current source) which may be used to implement amplifier 738 (FIG.

7). Summing amplifier circuit 830 also includes capacitors 832, 836, and 840 which may be used to implement capacitors 732, 736, and 740 (FIG. 7). Summing amplifier circuit 830 also includes transistors 842 and 844 which may be used to implement switches 742 and 744 (FIG. 7). Summing amplifier circuit 830 also includes nodes 834 and 846 corresponding to nodes 734 and 746 (FIG. 7).

S/H circuit 850 includes a transistor 852, a node 854, and a capacitor 856 which may be used to implement switch 752, node 754, and capacitor 756 (FIG. 7). Transistor 852 may be selectively switched in response to signal UCSH_B.

Buffer circuit 860 includes transistors 862 and 864 which may be used to implement buffer circuit 760 (FIG. 7). The operation of unit cell 700 and schematic diagram 800 may be further understood with reference to FIG. 9 which illustrates a timing diagram example 900 in accordance with an embodiment of the invention.

Figure 9:
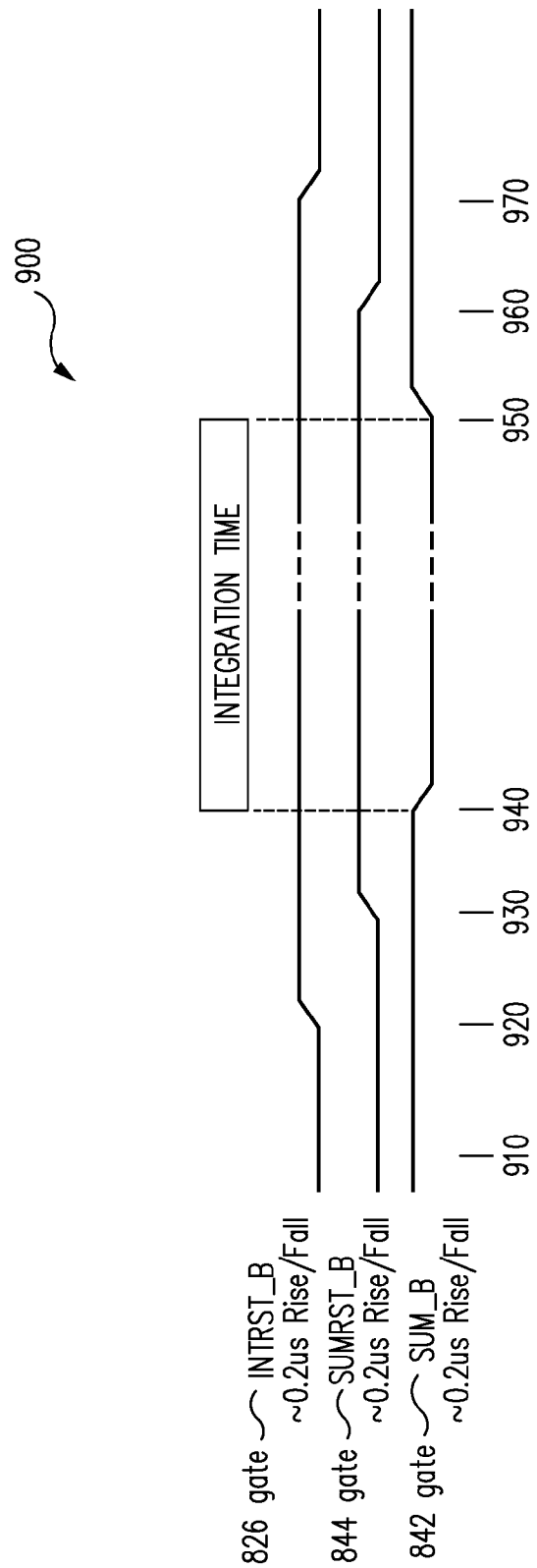
FIG. 9 illustrates a timing diagram example illustrating the operation of the unit cell of FIG. 7 and the schematic diagram of FIG. 8 in accordance with an embodiment of the invention.

As shown in FIG. 9, timing diagram 900 illustrates signals INTRST_B, SUMRST_B, and SUM_B (e.g., any of which may be system control signals or local control signals in various embodiments). As similarly discussed with regard to timing diagram 600, the various time intervals discussed with regard to timing diagram 900 are provided only for purposes of example and other time intervals may be used where appropriate.

At a time 910, signal INTRST_B keeps switch/transistor 726/826 turned on. Accordingly, switch/transistor 726/826 operates to pull node 724/824 to reset voltage VRST. Also at time 910, signal SUMRST_B keeps switch 744/transistor 844 turned on and resets amplifier 738 (e.g., corresponding to transistors 841, 843, 847, and 849). Also at time 910, signal SUM_B keeps switch 742/transistor 842 turned off.

At a time 920, signal INTRST_B turns off switch/transistor 726/826. At a time 930, signal SUMRST_B turns off switch/transistor 744/844 which releases the clamp of capacitor 732/832 and allows the change in voltage at node 822 to appear at node 734/834 which is the input node of amplifier 738.

At a time 940, signal SUM_B turns on switch 742/transistor 842 to connect capacitor 740/840 across amplifier 738. From time 940 to a time 950, amplifier 738 operates to integrate the voltage at node 734/834. In this regard, an optical pulse received by detector 710/810 may cause the voltage across capacitor 740/840 to increase until signal SUM_B turns off switch 742/transistor 842 (e.g., at time 950).

At a time 960, signal SUMRST_B turns on switch 744/transistor 844 to reset amplifier 738 to perform another integration in response to the next optical pulse received by detector 710/810. At a time 970, signal INTRST_B turns on switch 726/transistor 826 to pull node 724/824 back to reset voltage VRST.

Following time 970, the above-described process may loop back to time 910 to integrate the voltage across capacitor 740/840 for any desired number of optical pulses. Advantageously, capacitor 740/840 retains the voltage integrated by amplifier 738 for previous optical pulses. As a result, the voltage across capacitor 740/840 may continue to increase as additional optical pulses are received. Moreover, because multiple optical pulses may be integrated in this embodiment, the power level of the individual pulses need not be large (e.g., multiple low power level optical pulses may be integrated if desired).

After the desired number of optical pulses have been integrated, signal UCSH_B may be used to turn on switch 752/transistor 852 which causes the final voltage across capacitor 740/840 to be sampled by S/H circuit 750/850 and held by capacitor 756/856 to be read out from unit cell 700 through buffer circuit 760/860. Thus, a slice (e.g., corresponding to one of image frames 140 of FIG. 1A) of a three dimensional object (e.g., object 130 of FIG. 1A) may be obtained from one or more optical pulses.

After the integrated signal has been sampled by S/H circuit 750/850, signal SUM_B and signal SUMRST_B may be used to turn on switch/transistor 742/842 and switch/transistor 744/844 such that switch/transistor 742/842 and switch/transistor 744/844 remain on for an overlapping period of time. As a result, capacitor 740/840 may be cleared in preparation for another integration. Advantageously, the clearing of capacitor 740/840 between integrations effectively permits summing amplifier circuit 730/830 to operate in accordance with correlated double sampling techniques.

Figure 10:
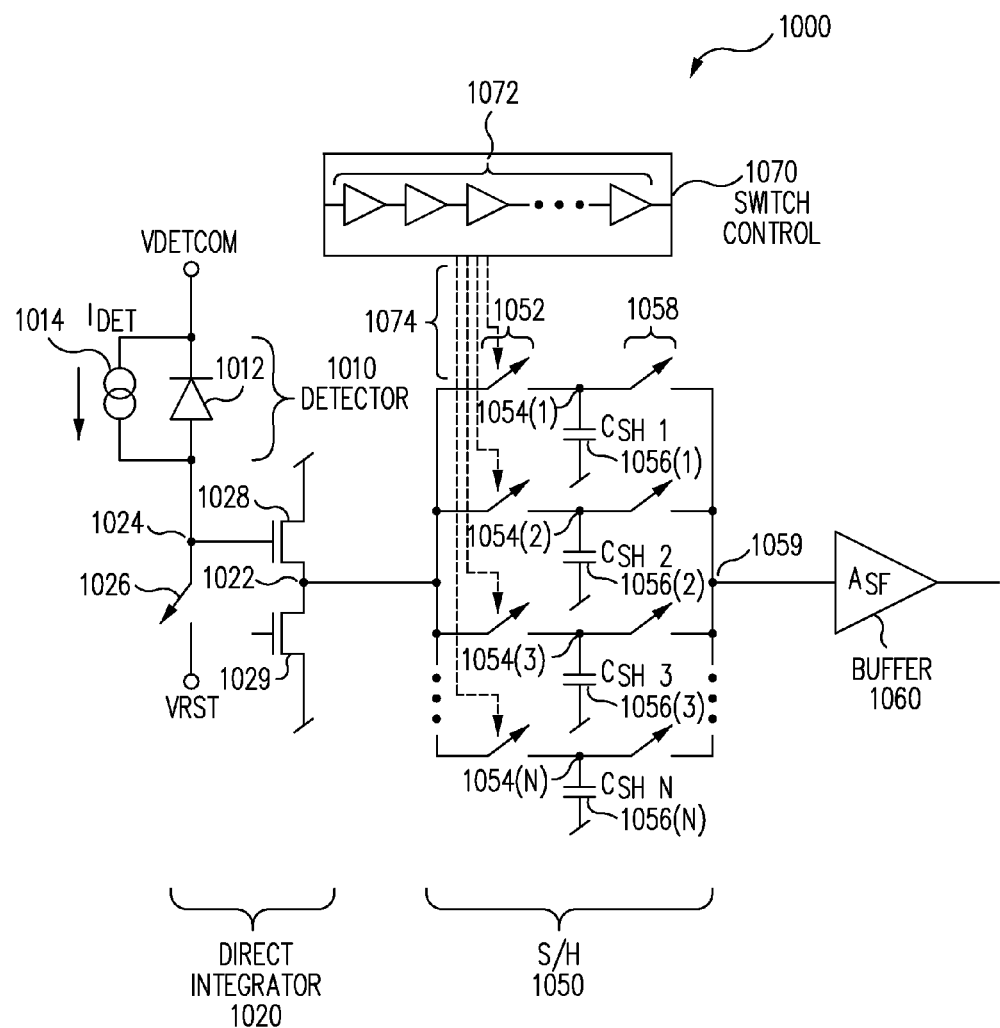
FIG. 10 illustrates another circuit diagram of a unit cell configured to capture a plurality of samples associated with a single optical pulse received by a focal plane array in accordance with an embodiment of the invention.

FIG. 10 illustrates another circuit diagram of a unit cell 1000 configured to capture a plurality of samples associated with a single optical pulse received by FPA 260 in accordance with an embodiment of the invention. Unit cell 1000 includes a detector 1010, a direct integrator circuit 1020, an S/H circuit 1050, a buffer circuit 1060, and a switch control circuit 1070.

Detector 1010 may be implemented in accordance with any of the types of detectors discussed herein. In the particular embodiment shown in FIG. 10, detector 1010 is modeled, for example, as a diode 1012 and a current source 1014. For example, an optical pulse incident on detector 1010 causes detector 1010 to operate as current source 1014 to conduct current from a voltage source VDETCOM to a node 1024.

As similarly described with regard to unit cells 400 and 700 (FIGS. 4 and 7), direct integrator circuit 1020 and S/H circuit 1050 of unit cell 1000 may be implemented to respond to rapid changes (e.g., changes occurring within approximately 1 nanosecond or less) in current received from detector 1010 to facilitate sampling of radiation pulses received by detector 1010 with high precision (e.g., sampling at a desired time with an accuracy of approximately 1 nanosecond or less).

Direct integrator circuit 1020 includes a switch 1026, transistors 1028 and 1029, and nodes 1022 and 1024. In one embodiment, the various components of direct integrator circuit 1020 may be implemented in accordance with similar components of FIGS. 4-5 and 7-8.

S/H circuit 1050 includes a plurality of switches 1052 which may be used to selectively connect node 1022 to a plurality of capacitors 1056 (labeled 1056(1) to 1056(N)) at nodes 1054 (labeled 1054(1) to 1054(N)) in response to a plurality of control signals 1074 provided by switch control circuit 1070. In this regard, switch control circuit 1070 may be implemented as a delay line with a plurality of delay taps 1072. Delay taps 1072 may be used to stagger the timing of control signals 1074 to sequentially operate switches 1052 at desired time intervals (e.g., at approximately 5 nanosecond intervals or other intervals).

For example, switches 1052 may remain closed while the voltages at nodes 1054 change in response to an optical pulse incident on detector 1010. In response to control signals 1074, switches 1052 may sequentially open at desired time intervals to sample and hold the current voltages at nodes 1054. As a result, a plurality of different samples may be captured during the propagation of a single optical pulse received by detector 1010.

S/H circuit 1050 also includes a plurality of switches 1058 which may be used to selectively connect nodes 1054 to buffer circuit 1060 to pass the sampled values stored at nodes 1054 to a node 1059 in response to a system control signal or a local control signal.

Buffer circuit 1060 is connected to S/H circuit 1050 at node 1059 and may be used to pass samples captured by S/H circuit 1050 for readout to other portions of imaging system 100. For example, in one embodiment, buffer circuit 1060 may be a column buffer of a readout integrated circuit configured to read sampled values from a plurality of unit cells 1010 of FPA 260. In one embodiment, additional off chip circuitry may be used to determine differences between the sampled values (e.g., voltages) read out from nodes 1054 in accordance with CDS techniques.

Figure 11A:
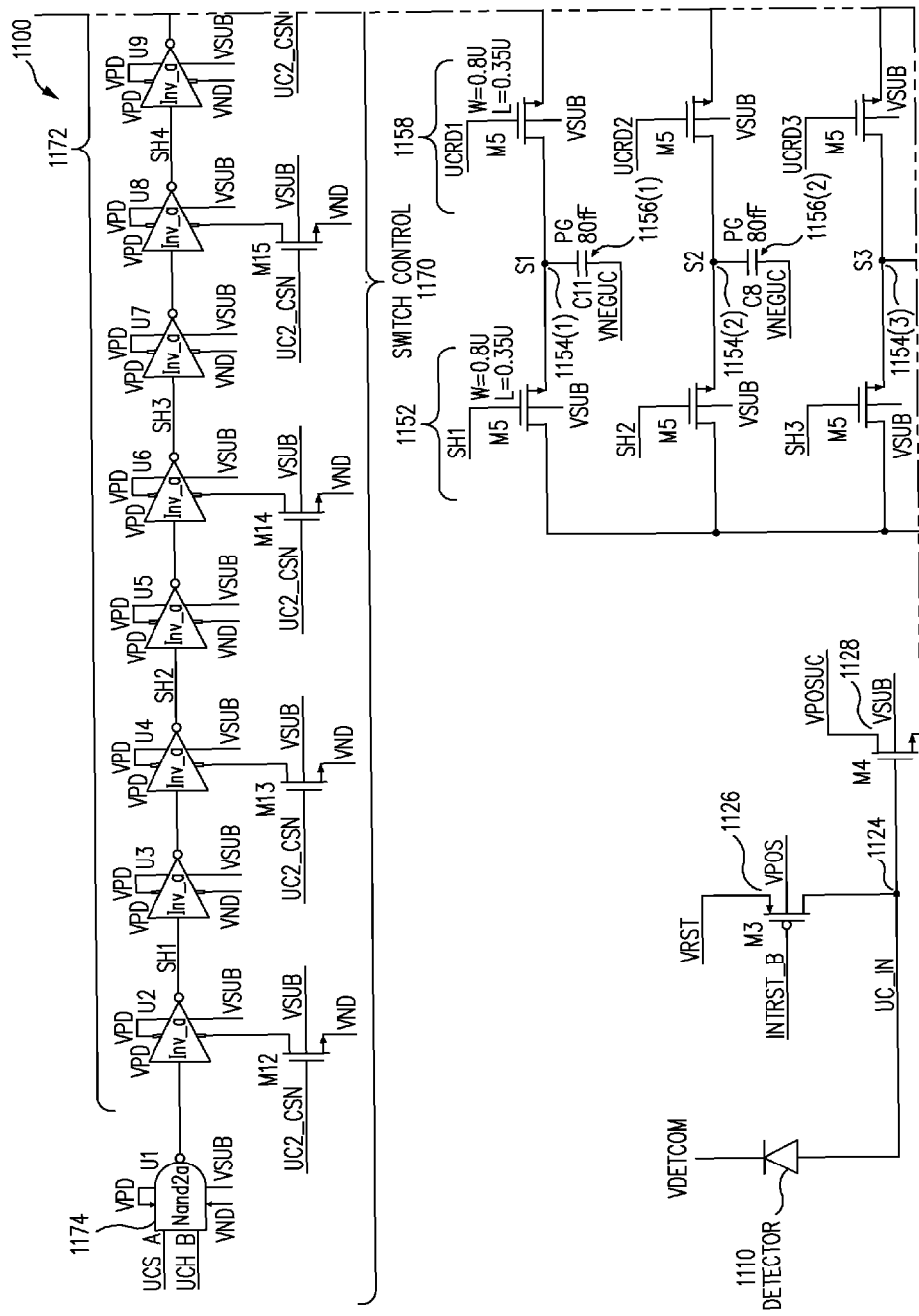
FIG. 11 illustrates a specific schematic diagram implementation example for the unit cell of FIG. 10 in accordance with an embodiment of the invention.
Figure 11B:
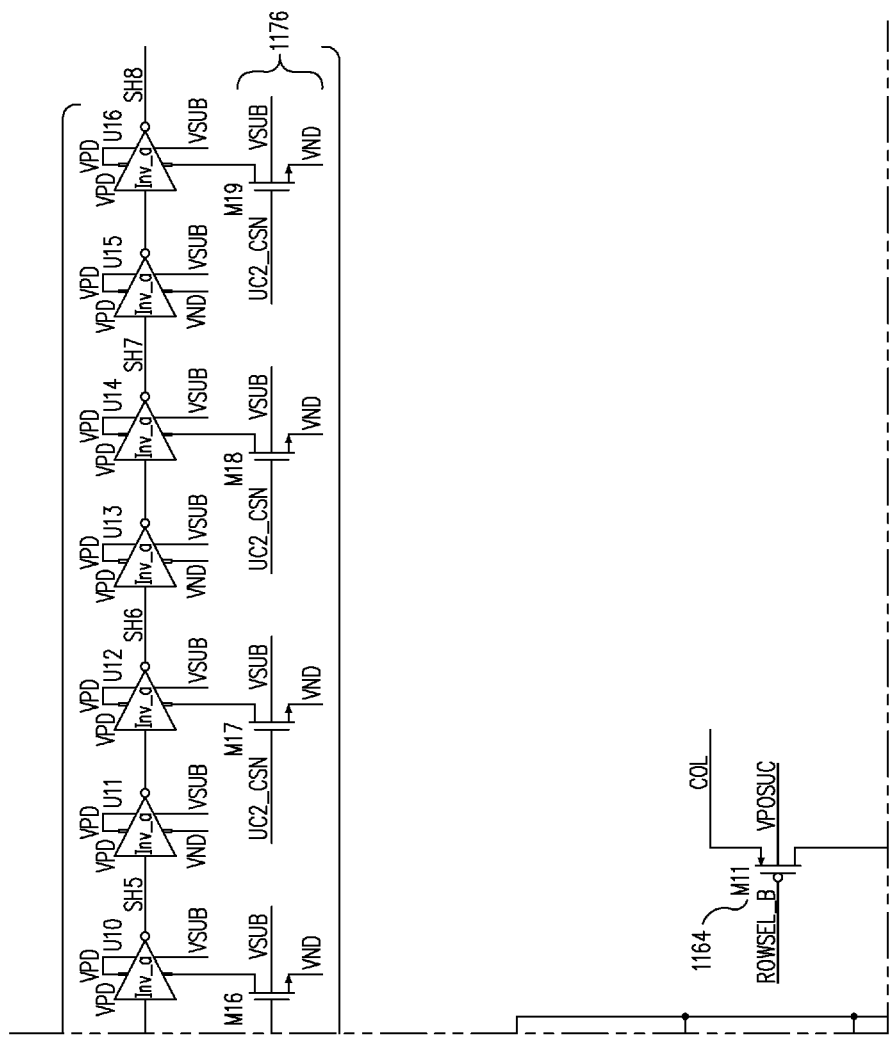
Figure 11C:
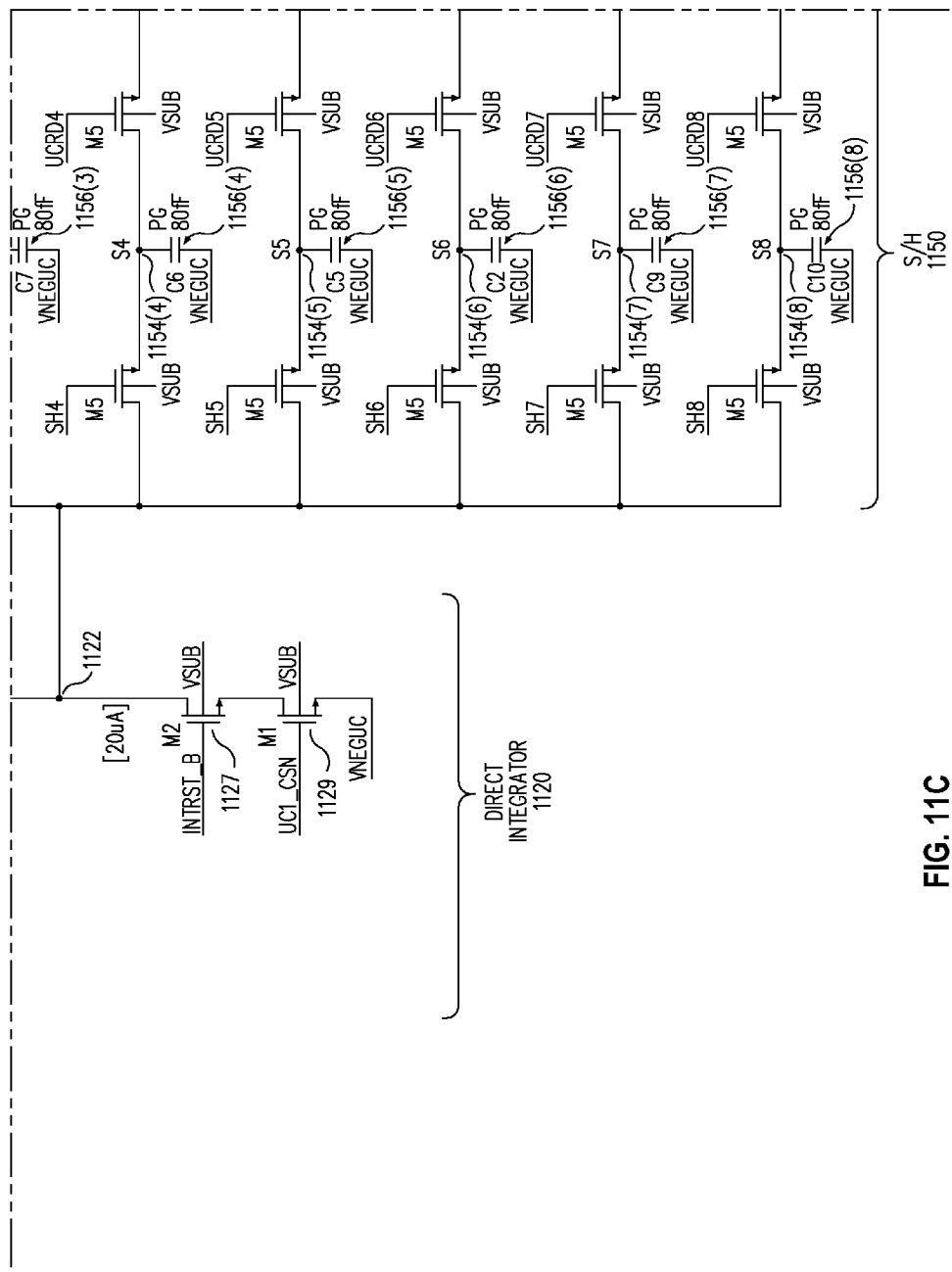

FIG. 11 illustrates a specific schematic diagram implementation example 1100 for the unit cell of FIG. 10 in accordance with an embodiment of the invention. Schematic diagram 1100 includes a detector 1110, a direct integrator circuit 1120, an S/H circuit 1150, a buffer circuit 1160, and a switch control circuit 1170, all of which may be used to implement similar features of FIG. 10.

Direct integrator circuit 1120 includes a transistor 1126 which may be selectively switched by signal INTRST_B to implement switch 1026 (FIG. 10). Direct integrator circuit 1120 also includes transistors 1128 and 1129 which may be used to implement transistors 1028 and 1029 (FIG. 10). As shown in FIG. 11, transistor 1129 is biased by a signal UC1_CSN. Direct integrator circuit 1120 also includes a transistor 1127 which may be switched on by signal INTRST_B to turn on the source follower provided by transistors 1128 and 1129. When transistor 1127 is on, the voltage at a node 1122 follows changes in the voltage at the gate of transistor 1128 (i.e., at a node 1124).

S/H circuit 1150 includes transistors 1152, nodes 1154 (labeled 1154(1) to 1154(8)), capacitors 1156 (labeled 1156(1) to 1156(8)), transistors 1158, and a node 1159 which may be used to implement switches 1052, nodes 1054, capacitors 1056, transistor 1058, and node 1059 (FIG. 10). Transistors 1152 may be selectively switched in response to control signals (labeled SH1 to SH8) provided by switch control circuit 1170. Transistors 1158 may be selectively switched in response to control signals provided by system control signals or local control signals to pass the sampled values stored at nodes 1154.

Buffer circuit 1160 includes transistors 1162 and 1164 which may be used to implement buffer circuit 1060 (FIG. 10). Switch control circuit 1170 includes a plurality of delay taps 1172 and logic 1174 which may be used to provide control signals SH1-8. In one embodiment, switch control circuit 1170 also optionally includes a plurality of transistors 1176 which may be operated to selectively adjust delay times associated with delay taps 1172.

Figure 12:
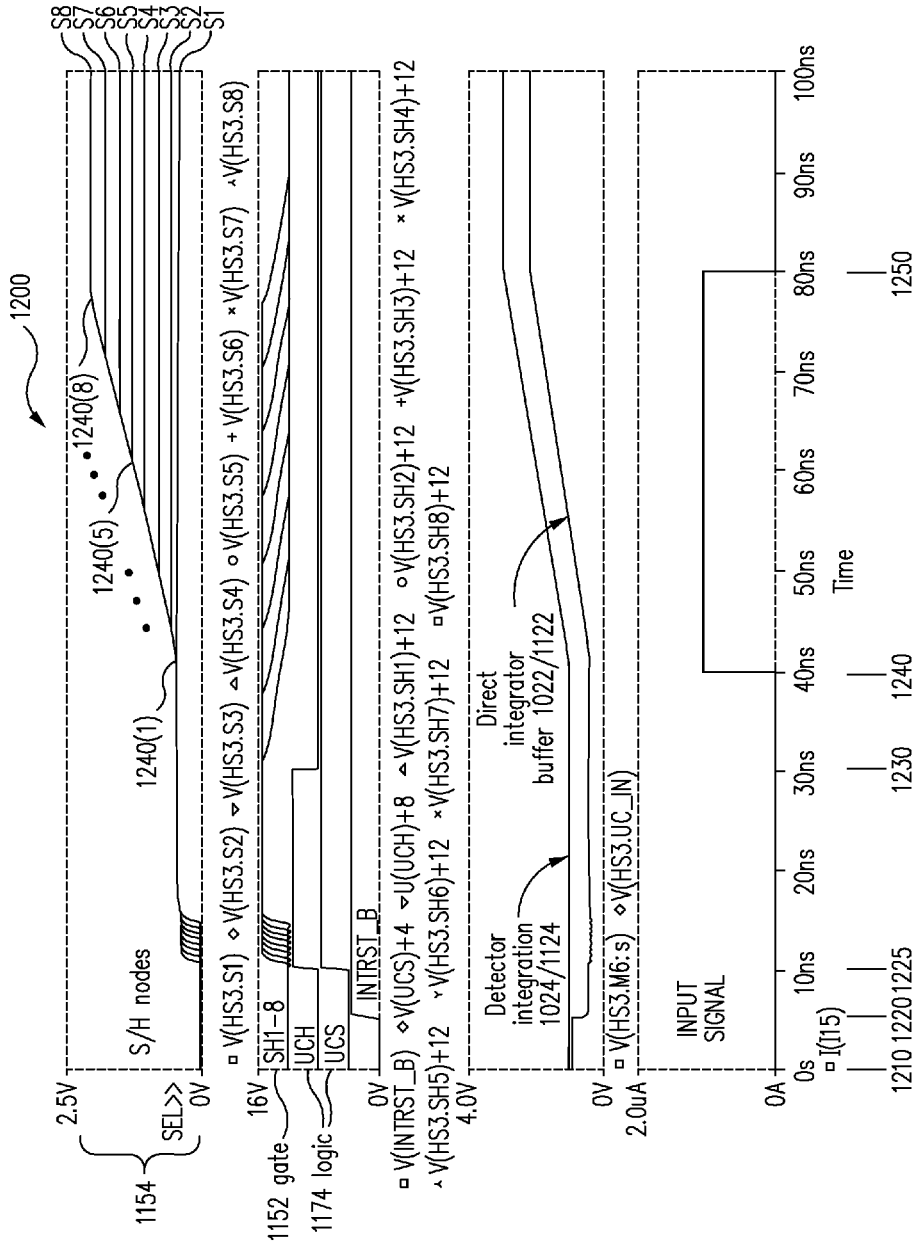
FIG. 12 illustrates a timing diagram example illustrating the operation of the unit cell of FIG. 10 and the schematic diagram of FIG. 11 in accordance with an embodiment of the invention.

The operation of unit cell 1000 and schematic diagram 1100 may be further understood with reference to FIG. 12 which illustrates a timing diagram example 1200 in accordance with an embodiment of the invention. As shown in FIG. 12, timing diagram 1200 illustrates: the voltages at nodes 1022/1122, 1024/1124, and 1054/1154; signals INTRST_B, UCS, UCH, and SH1-8 (e.g., any of which may be system control signals or local control signals in various embodiments); and the current provided by detector 1010/1110 (i.e., current source 1014) in response to an optical pulse incident on detector 1010/1110. As similarly discussed with regard to timing diagrams 600 and 900, the various time intervals discussed with regard to timing diagram 1200 are provided only for purposes of example and other time intervals may be used where appropriate.

At a time 1210 (e.g., 0 nanoseconds), signal INTRST_B keeps switch/transistor 1026/1126 turned on and keeps the source followers provided by transistors 1028/1128 and 1029/1129 turned off. Accordingly, switch/transistor 1026/1126 operates to pull node 1024/1124 to reset voltage VRST. Also at time 1210, signals UCS and UCH cause logic 1174 to provide a logic low value to delay taps 1172. As a result, control signals 1074/SH1-8 also exhibit logic low values.

At a time 1220 (e.g., approximately 7 nanoseconds), signal INTRST_B turns off switch/transistor 1026/1126 and turns on the source followers provided by transistors 1028/1128 and 1029/1129. At time 1225 (e.g., approximately 10 nanoseconds), signals UCS and UCH transition to logic high values. As a result, logic 1174 provides a logic high value to delay taps 1172 which causes control signals 1074/SH1-8 to transition to logic high values.

At a time 1230 (e.g., approximately 30 nanoseconds), signal UCH transitions to a logic low value which causes control signals 1074/SH1-8 to sequentially transition from logic high values to logic low values (e.g., over the period from approximately 30 nanoseconds to approximately 90 nanoseconds). As a result, switches/transistors 1052/1152 are sequentially turned off in response to control signals 1074/SH1-8.

Prior to time 1220, any optical pulses incident on detector 1010/1110 are ignored (e.g., rejected as background reflections such as scatter or clutter). As a result, any current associated with an optical pulse on detector 1010/1110 during these times will not cause the voltage at node 1024/1124 to change appreciably. Starting at time 1220, any optical pulses incident on detector 1010/1110 will contribute to the output signal of unit cell 1000/1100. As an example, beginning at a time 1240 (e.g., approximately 40 nanoseconds) and continuing to time 1250 (e.g., approximately 80 nanoseconds), detector 1010/1110 receives an optical pulse corresponding to one of image frames 140 of FIG. 1A (e.g., image frame 140A) which causes detector 1010/1110 to provide a current (e.g., approximately 1.1 µA). As a result, the voltages at nodes 1024/1124, 1022/1122, and 1054/1154 begin to rise at time 1240 and continue to rise while detector 1010/1110 continues to receive the optical pulse.

As control signals 1074/SH1-8 transition from logic high values to logic low values, they cause corresponding switches/transistors 1052/1152 to turn off sequentially at times 1240(1) through 1240(8) (e.g., at approximately 5 nanosecond intervals or other intervals) during which an optical pulse is received by detector 1010/1110. For example, in one embodiment, times 1240(1) through 1240(8) correspond to times during which image frames 140A through 140H of FIG. 1A are received by detector 1010/1110. In this embodiment, image frames 140A through 140H correspond to portions of a single reflected optical pulse (e.g., time 1240(1) may correspond to a time during which a first portion of laser pulse 120 is reflected back and received by detector 1010/1110 as image frame 140A, time 1240(2) may correspond to a time during which a second portion of laser pulse 120 is reflected back and received by detector 1010/1110 as image frame 140B, and so on). Although eight discrete times 1240(1) through 1240(8) are shown in FIG. 12, any desired number of times or time interval lengths may be used. For example, in one embodiment, ten discrete times corresponding to ten image frames 140A-J may be used.

The voltages of each of nodes 1054/1154 also rise over time until one of control signals 1074/SH1-8 turns off a corresponding one of switches/transistors 1052/1152 (e.g., at one of times 1240(1) through 1240(9) which causes the voltages at nodes 1054/1154 to be captured and held at nodes 1054/1154 to be read out from through buffer circuit 1060/1160.

Advantageously, by staggering the switching of switches/transistors 1052/1152 (e.g., by providing control signals 1074/SH1-8 from switch control circuit 1070/1170), a plurality of different samples may be captured during the propagation of a single optical pulse received by detector 1010/1110. Thus, a plurality of slices (e.g., corresponding to image frames 140 of FIG. 1A) of a three dimensional object (e.g., object 130 of FIG. 1A) may be obtained from a single optical pulse.

Although various embodiments of different types of unit cells have been shown and described in relation to FIGS. 4-12, other embodiments are also contemplated. In this regard, features of unit cells 400, 700, and/or 1000 may be combined with each other as may be appropriate for particular applications. For example, CDS circuit 430/530 of unit cell 400 may be provided in unit cell 700 and/or 1000 in another embodiment; summing amplifier circuit 730/830 of unit cell 700 may be provided in unit cell 400 and/or 1000 in another embodiment; and S/H circuit 1050/1150 and switch control circuit 1070/1170 may be provided in unit cell 400 and/or 700 in place of or in addition to S/H circuits 450/550 and/or 750/850 in another embodiment.

Moreover, the particular types of transistors shown (e.g., in schematic diagrams 500, 800, and 1100) are not limiting. For example, n-channel transistors may be used in place of p-channel transistors, and vice versa, where appropriate in particular embodiments.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

We claim:

1. A focal plane array (FPA) comprising:
a plurality of unit cells arranged in a plurality of rows and a plurality of columns, each unit cell of the FPA comprising:
a detector comprising a diode adapted to provide a current in response to an optical pulse received by the detector; and
a first circuit comprising:
an integrator circuit comprising:
an input node adapted to receive the current from the detector,
an output node,
a source follower amplifier connected between the input node and the output node and adapted to provide a first voltage at the output node that changes in response to the current received at the input node, and
a first switch adapted to selectively set the input node to a reset voltage before the current is received from the detector;
a sample and hold (S/H) circuit comprising a first capacitor and a second switch, wherein the first capacitor comprises a first terminal connected to a reference voltage and a second terminal connected to the second switch, wherein the S/H circuit is adapted to sample a second voltage across the first capacitor using the second switch, wherein the second voltage is associated with the first voltage;
a correlated double sampling (CDS) circuit connected to the integrator circuit and the S/H circuit and adapted to set the second terminal of the first capacitor to the reference voltage and then provide the second voltage to the second terminal of the first capacitor;
a buffer adapted to provide the second voltage to be read out from the unit cell; and
wherein at least one of the detectors and at least one of the first circuits is provided for each unit cell of the FPA.

2. The FPA of claim 1, wherein the second switch is adapted to selectively connect the first capacitor to the CDS circuit, wherein the CDS circuit comprises a third switch adapted to set the first capacitor to the reference voltage before the second voltage is received at the first capacitor through the second switch.

3. The FPA of claim 2, wherein the S/H circuit is adapted to sample a plurality of voltages associated with values of the first voltage at a plurality of time intervals associated with a plurality of optical pulses.

4. The FPA of claim 1, each unit cell further comprising a summing amplifier circuit connected to the integrator circuit and the S/H circuit, wherein the summing amplifier circuit is adapted to integrate the first voltage over a plurality of optical pulses to provide the second voltage to the first capacitor.

5. The FPA of claim 4, wherein the summing amplifier circuit comprises:
an amplifier;
a third switch adapted to selectively reset the amplifier;
a second capacitor; and
a fourth switch adapted to selectively connect the second capacitor in a feedback path of the amplifier to integrate the first voltage across the second capacitor.

6. The FPA of claim 1, wherein the S/H circuit is further adapted to sample a plurality of voltages associated with values of the first voltage at a plurality of time intervals associated with the optical pulse.

7. The FPA of claim 6, wherein the S/H circuit further comprises:
a plurality of capacitors; and
a plurality of switches adapted to selectively connect corresponding capacitors of the plurality of capacitors to the integrator circuit at corresponding time intervals of the plurality of time intervals to sample the plurality of voltages.

8. The FPA of claim 6, each unit cell further comprising:
a plurality of delay taps adapted to provide a plurality of control signals to the S/H circuit to sample the voltages at the time intervals; and
a plurality of transistors adapted to be operated to selectively adjust the time intervals by adjusting a plurality of delay times associated with the delay taps.

9. The FPA of claim 1, wherein the diode is a reverse-biased PIN diode.

10. The FPA of claim 1, wherein the optical pulse is a reflected laser pulse, wherein the second voltage corresponds to a value associated with one of a plurality of pixels of the FPA.

11. A method of operating a unit cell of a focal plane array (FPA), wherein the FPA comprises a plurality of the unit cells, the method comprising:
  setting an input node of an integrator circuit to a reset voltage by operating a first switch;
  detecting an optical pulse using a diode;
  providing a current to the input node in response to the detecting, wherein the current causes the input node to adjust from the reset voltage to an input voltage;
  providing a first voltage at an output node of the integrator circuit based on the input voltage;
  sampling, by a sample and hold (S/H) circuit, a second voltage across a first capacitor using a second switch of the S/H circuit, wherein the first capacitor comprises a first terminal connected to a reference voltage and a second terminal connected to the second switch, wherein the second voltage is associated with the first voltage;
  operating a correlated double sampling (CDS) circuit by:
    setting the second terminal of the first capacitor to the reference voltage, and
    providing the second voltage to the second terminal of the first capacitor after the second terminal of the first capacitor is set to the reference voltage;
  providing, by a buffer, the second voltage to be read out from the unit cell;
  wherein the unit cells are arranged in a plurality of rows and a plurality of columns;
  wherein the integrator circuit, the S/H circuit, the CDS circuit, and the buffer are provided by a first circuit; and
  wherein at least one of the diodes and at least one of the first circuits is provided for each unit cell of the FPA.

12. The method of claim 11, further comprising:
  sampling a plurality of voltages associated with values of the first voltage at a plurality of time intervals associated with a plurality of optical pulses; and
  providing the plurality of voltages to be read out from the unit cell.

13. The method of claim 11, further comprising integrating the first voltage over a plurality of optical pulses to provide the second voltage to the capacitor.

14. The method of claim 13, wherein the integrating comprises performing the following for each optical pulse of a plurality of optical pulses:
  resetting an amplifier;
  connecting a second capacitor in a feedback path of the amplifier;
  integrating the first voltage across the second capacitor; and
  disconnecting the second capacitor from the feedback path.

15. The method of claim 11, further comprising sampling a plurality of voltages associated with values of the first voltage at a plurality of time intervals associated with the optical pulse.

16. The method of claim 15, further comprising:
  providing a plurality of control signals to sample the voltages at the time intervals; and
  selectively adjusting the time intervals.

17. The method of claim 11, wherein the diode is a reverse-biased PIN diode.

18. The method of claim 11, wherein the optical pulse is a reflected laser pulse, wherein the second voltage corresponds to a value associated with one of a plurality of pixels of the FPA.

19. A focal plane array (FPA) comprising a plurality of unit cells, each unit cell of the FPA comprising:
  means for setting an input node of an integrator circuit to a reset voltage;
  means for detecting an optical pulse;
  means for providing a current to the input node in response to the detecting means, wherein the current causes the input node to adjust from the reset voltage to an input voltage;
  means for providing a first voltage at an output node of the integrator circuit based on the input voltage;
  means for sampling a second voltage associated with the first voltage, wherein the sampling means comprises: a switch, and a capacitor comprising a first terminal connected to a reference voltage and a second terminal connected to the switch;
  means for setting the second terminal of the capacitor to the reference voltage;
  means for providing the second voltage to the sampling means after the sampling means is set to the reference voltage;
  means for providing the second voltage to be read out from the unit cell;
  wherein the unit cells are arranged in a plurality of rows and a plurality of columns;
  wherein the integrator circuit, the sampling means, the reference voltage setting means, and the second voltage providing means are provided by a first circuit; and
  wherein at least one of the detecting means and at least one of the first circuits is provided for each unit cell of the FPA.

20. The FPA of claim 19, each unit cell further comprising:
  means for sampling a plurality of voltages associated with values of the first voltage at a plurality of time intervals associated with a plurality of optical pulses; and
  means for providing the plurality of voltages to be read out from the unit cell.

21. The FPA of claim 19, each unit cell further comprising means for integrating the first voltage over a plurality of optical pulses to provide the second voltage to the sampling means.

22. The FPA of claim 19, each unit cell further comprising means for sampling a plurality of voltages associated with values of the first voltage at a plurality of time intervals associated with the optical pulse.

23. The FPA of claim 22, each unit cell further comprising:
  means for providing a plurality of control signals to sample the voltages at the time intervals; and
  means for selectively adjusting the time intervals.

24. The FPA of claim 19, wherein the optical pulse is a reflected laser pulse, wherein the second voltage corresponds to a value associated with one of a plurality of pixels of the FPA.

* * * * *